(12) United States Patent
Iwano et al.

(10) Patent No.: US 11,411,453 B2
(45) Date of Patent: Aug. 9, 2022

(54) MOTOR

(71) Applicant: Nidec Corporation, Kyoto (JP)

(72) Inventors: Yasuhiko Iwano, Kyoto (JP); Tatsuya Onishi, Kyoto (JP); Kosuke Ogawa, Kyoto (JP); Takashi Seguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 208 days.

(21) Appl. No.: 16/638,785

(22) PCT Filed: Sep. 25, 2018

(86) PCT No.: PCT/JP2018/035335
§ 371 (c)(1),
(2) Date: Feb. 13, 2020

(87) PCT Pub. No.: WO2019/065586
PCT Pub. Date: Apr. 4, 2019

(65) Prior Publication Data
US 2020/0220412 A1     Jul. 9, 2020

(30) Foreign Application Priority Data

Sep. 28, 2017  (JP) .............................. JP2017-188227

(51) Int. Cl.
*H02K 3/50*     (2006.01)
*H02K 3/52*     (2006.01)
(Continued)

(52) U.S. Cl.
CPC ............... *H02K 3/50* (2013.01); *H02K 3/522* (2013.01); *H02K 5/225* (2013.01); *H02K 3/18* (2013.01);
(Continued)

(58) Field of Classification Search
CPC .......... H02K 3/50; H02K 3/522; H02K 21/14; H02K 2203/09; H02K 3/18; H02K 5/225;
(Continued)

(56) References Cited

U.S. PATENT DOCUMENTS

| 2009/0243418 A1* | 10/2009 | Ueta ..................... H02K 3/522 |
| | | 310/195 |
| 2013/0257200 A1 | 10/2013 | Nakayama et al. |

(Continued)

FOREIGN PATENT DOCUMENTS

| JP | 47-025801 U | 11/1972 |
| JP | 2008-289325 A | 11/2008 |

(Continued)

OTHER PUBLICATIONS

Official Communication issued in International Patent Application No. PCT/JP2018/035335, dated Dec. 25, 2018.

*Primary Examiner* — Quyen P Leung
*Assistant Examiner* — Alexander A Singh
(74) *Attorney, Agent, or Firm* — Keating & Bennett

(57) ABSTRACT

A motor includes a rotor with a shaft disposed along a central axis, a stator including coils and facing the rotor via a gap in a radial direction, bus-bars electrically connected to the stator, and bus-bar holders on one side in the axial direction of the stator that are distinct members separated from each other. The coils define coil groups having power systems different from each other. Each of the bus-bar holders holds at least one of the bus-bars different from each other. In each of the bus-bar holders, at least one of the bus-bars held on the bus-bar holder includes a connection terminal electrically connected to an electrical component.

16 Claims, 8 Drawing Sheets

(51) Int. Cl.
    *H02K 5/22*          (2006.01)
    *H02K 3/18*          (2006.01)
    *H02K 21/14*        (2006.01)

(52) U.S. Cl.
    CPC ......... *H02K 21/14* (2013.01); *H02K 2203/09* (2013.01)

(58) Field of Classification Search
    CPC .. H02K 3/28; H02K 3/38; H02K 5/22; H02K 1/04; H02K 3/04; H02K 5/10
    USPC .......................................... 310/71, 214, 215
    See application file for complete search history.

(56) References Cited

U.S. PATENT DOCUMENTS

| | | | |
|---|---|---|---|
| 2015/0357877 A1 | 12/2015 | Bessho et al. | |
| 2016/0149454 A1* | 5/2016 | Haga | H02K 3/522 310/71 |
| 2016/0190887 A1* | 6/2016 | Sambuichi | H02K 3/38 310/71 |
| 2016/0294240 A1 | 10/2016 | Kawamoto et al. | |
| 2018/0241272 A1* | 8/2018 | Asahi | H02K 3/38 |

FOREIGN PATENT DOCUMENTS

| | | | | |
|---|---|---|---|---|
| JP | 2013-223297 A | 10/2013 | | |
| JP | 2016-032315 A | 3/2016 | | |
| WO | WO-2017026412 A1 * | 2/2017 | ............... | H02K 3/04 |

\* cited by examiner

MOTOR

CROSS REFERENCE TO RELATED APPLICATIONS

This is a U.S. national stage of PCT Application No. PCT/JP2018/035335, filed on Sep. 25, 2018, and priority under 35 U.S.C. § 119(a) and 35 U.S.C. § 365(b) is claimed from Japanese Application No. 2017-188227, filed Sep. 28, 2017; the entire disclosures of each of which are hereby incorporated herein by reference.

1. FIELD

The present disclosure relates to a motor.

2. BACKGROUND

A rotating electric machine in which a holder that holds a bus-bar is disposed on one side in the axial direction of a stator is known. For example, a rotating electric machine in which a line connection board structure that has a bus-bar and a holder is fixed to an insulator is known.

The rotating electric machine described above is provided with a plurality of power systems that supply power to a coil in some cases. In this case, the bus-bar has a connection terminal part that is provided for each of the power systems and is electrically connected to each electrical component such as a power supply device. However, in a case where a relative position of electrical components that are electrically connected respectively to the connection terminal part of each bus-bar is shifted, it is difficult to connect the plurality of connection terminal parts and the plurality of electrical components to each other in some cases.

SUMMARY

According to an aspect of an example embodiment of the present disclosure, a motor includes a rotor that includes a shaft disposed along a central axis, a stator including a plurality of coils and facing the rotor via a gap in a radial direction, a plurality of bus-bars that are electrically connected to the stator, and a plurality of bus-bar holders that are disposed on an one side in the axial direction of the stator and are separate members divided from each other. The plurality of coils define a plurality of coil groups having power systems different from each other. Each of the bus-bar holders holds at least one of the bus-bars different from each other. In each of the bus-bar holders, at least one of the bus-bars held on the bus-bar holder includes a connection terminal electrically connected to an electrical component.

The above and other elements, features, steps, characteristics and advantages of the present disclosure will become more apparent from the following detailed description of the example embodiments with reference to the attached drawings.

DETAILED DESCRIPTION

A Z-axis direction that is shown as appropriate in each drawing is an up-and-down direction with a positive side being an upper side and a negative side being a lower side. A central axis J, which is shown as appropriate in each drawing, is an imaginary line that is parallel to the Z-axis direction and extends in the up-and-down direction. In the following description, an axial direction of the central axis J, that is, a direction parallel to the up-and-down direction will be simply referred to as an "axial direction", a radial direction which is centered on the central axis J will be simply referred to as a "radial direction", and a circumferential direction which is centered on the central axis J will be simply referred to as a "circumferential direction". In each drawing, the circumferential direction will be shown appropriately with an arrow θ. In the example embodiments of the present disclosure, a radially inner side corresponds to one side in the radial direction, and a radially outer side corresponds to the other side in the radial direction.

In addition, the positive side of the Z-axis direction, which is the axial direction, will be referred to as the "upper side", and the negative side of the Z-axis direction, which is the axial direction, will be referred to as the "lower side". In the example embodiments of the present disclosure, the upper side corresponds to one side in the axial direction, and the lower side corresponds to the other side in the axial direction. In addition, a counterclockwise side in the circumferential direction when seen from the upper side to the lower side, that is, a side towards direction of the arrow θ will be referred to as a "one side in the circumferential direction". A clockwise side in the circumferential direction when seen from the upper side to the lower side, that is, a side towards a direction opposite to the direction of the arrow θ will be referred to as "the other side in the circumferential direction".

The up-and-down direction, the upper side, and the lower side are terms for simply describing a relative positional relationship of each part, and an actual dispositional relationship may be a dispositional relationship other than a dispositional relationship described with the terms.

Figure 1:
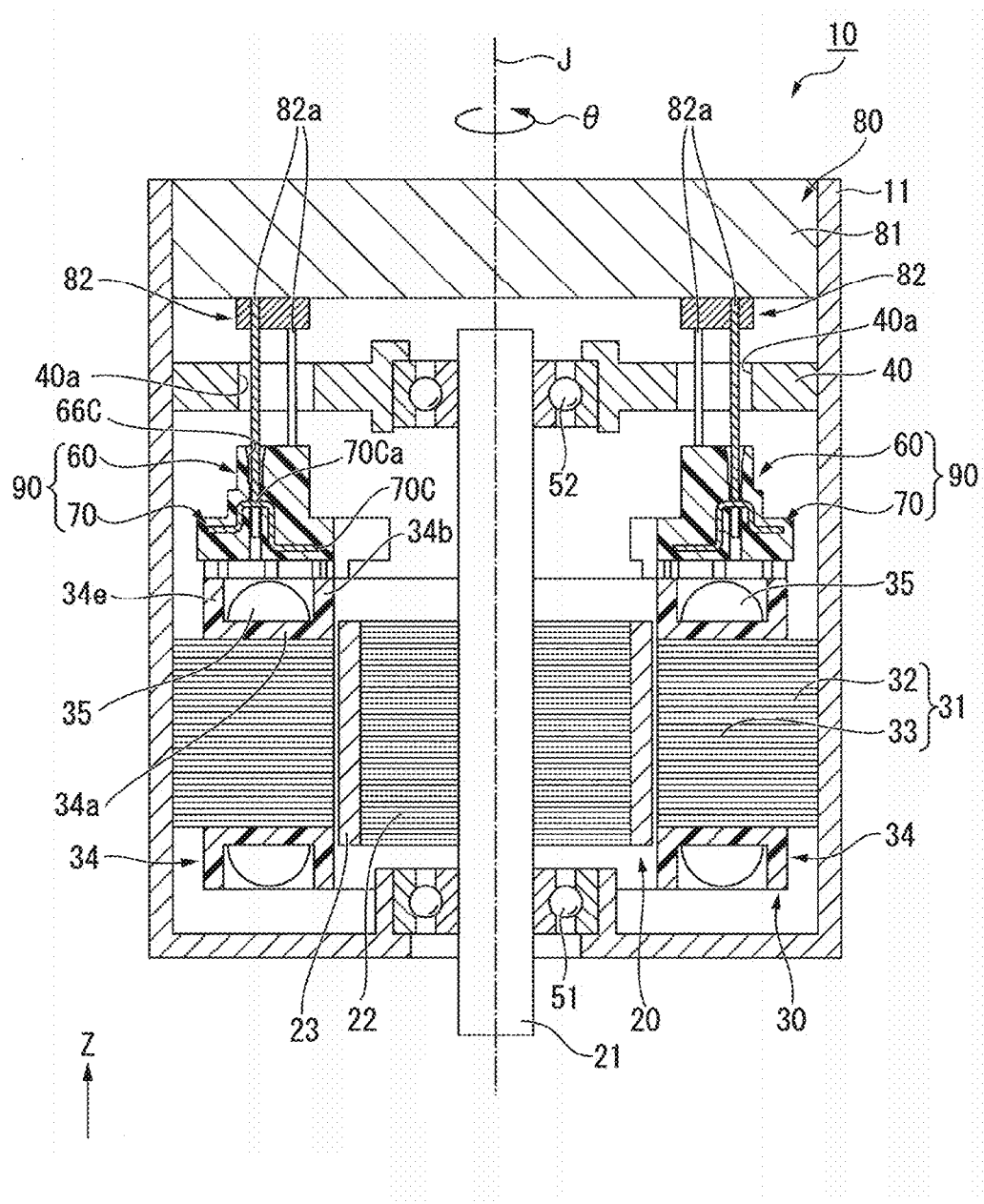
FIG. 1 is a sectional view illustrating a motor according to an example embodiment of the present disclosure.

As illustrated in FIG. 1, a motor 10 of an example embodiment of the present disclosure includes a housing 11, a rotor 20, bearings 51 and 52, a stator 30, a control device 80, bus-bar units 90, and a bearing holder 40. The housing 11 accommodates each part of the motor 10. The housing 11 has a cylindrical or substantially cylindrical shape and is centered on the central axis J. The housing 11 holds the bearing 51 on the bottom part at the lower side.

The rotor 20 has a shaft 21, a rotor core 22, and a magnet 23. The shaft 21 is disposed along the central axis J. The shaft 21 is rotatably supported by the bearings 51 and 52. The rotor core 22 has an annular or substantially annular shape and is fixed to an outer circumferential surface of the shaft 21. The magnet 23 is fixed to an outer circumferential surface of the rotor core 22. On the lower side of the rotor core 22, the bearing 51 rotatably supports the shaft 21. On the upper side of the rotor core 22, the bearing 52 rotatably supports the shaft 21. The bearings 51 and 52 are ball bearings.

The stator 30 faces the rotor 20 in the radial direction via a gap. The stator 30 surrounds the rotor 20 on the radially outer side of the rotor 20. The stator 30 has a stator core 31, insulators 34, and a plurality of coils 35. The stator core 31 has a core back 32 and a plurality of teeth 33.

Figure 2:
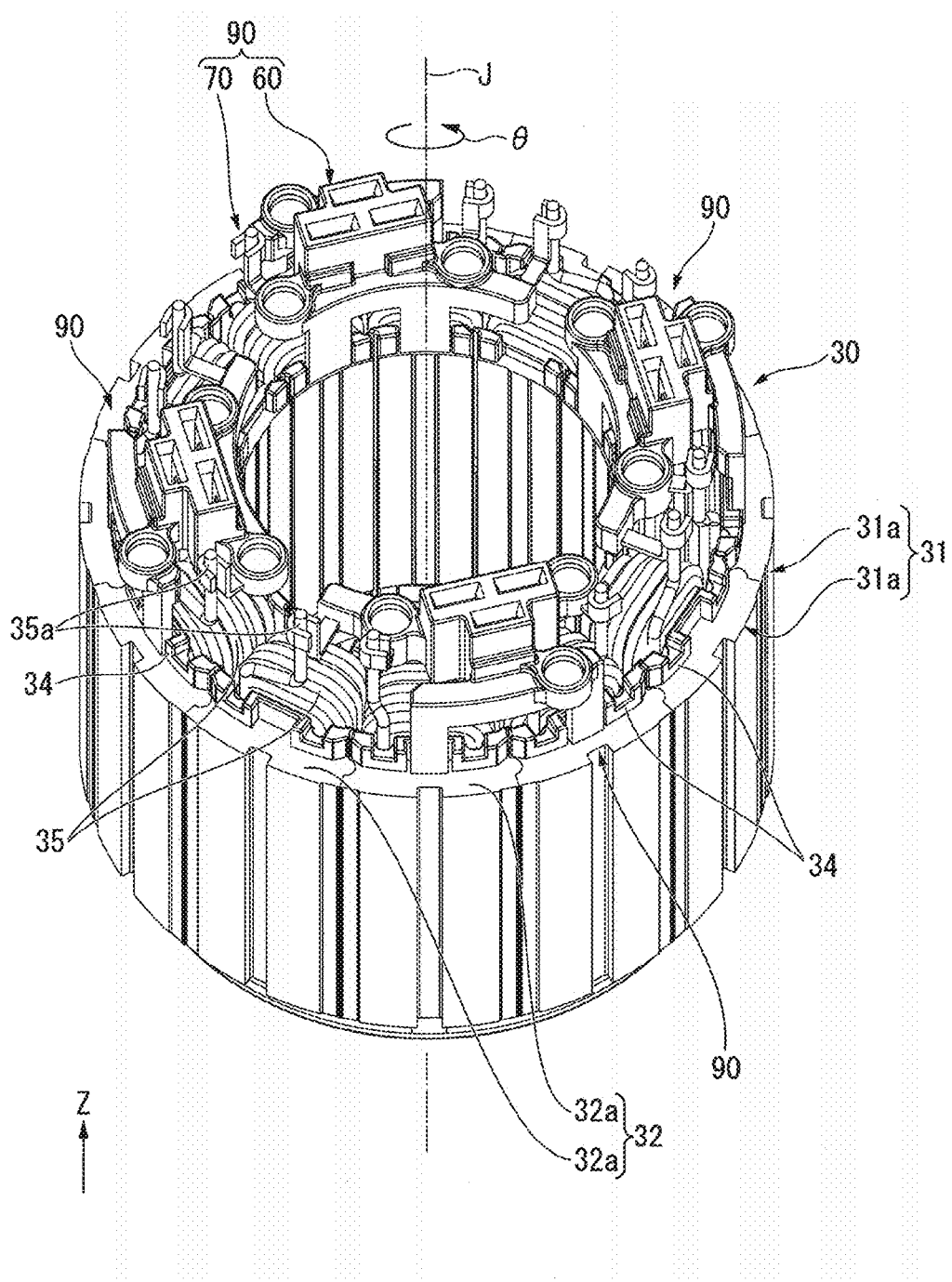
FIG. 2 is a perspective view illustrating a stator and a bus-bar unit according to an example embodiment of the present disclosure.
Figure 3:
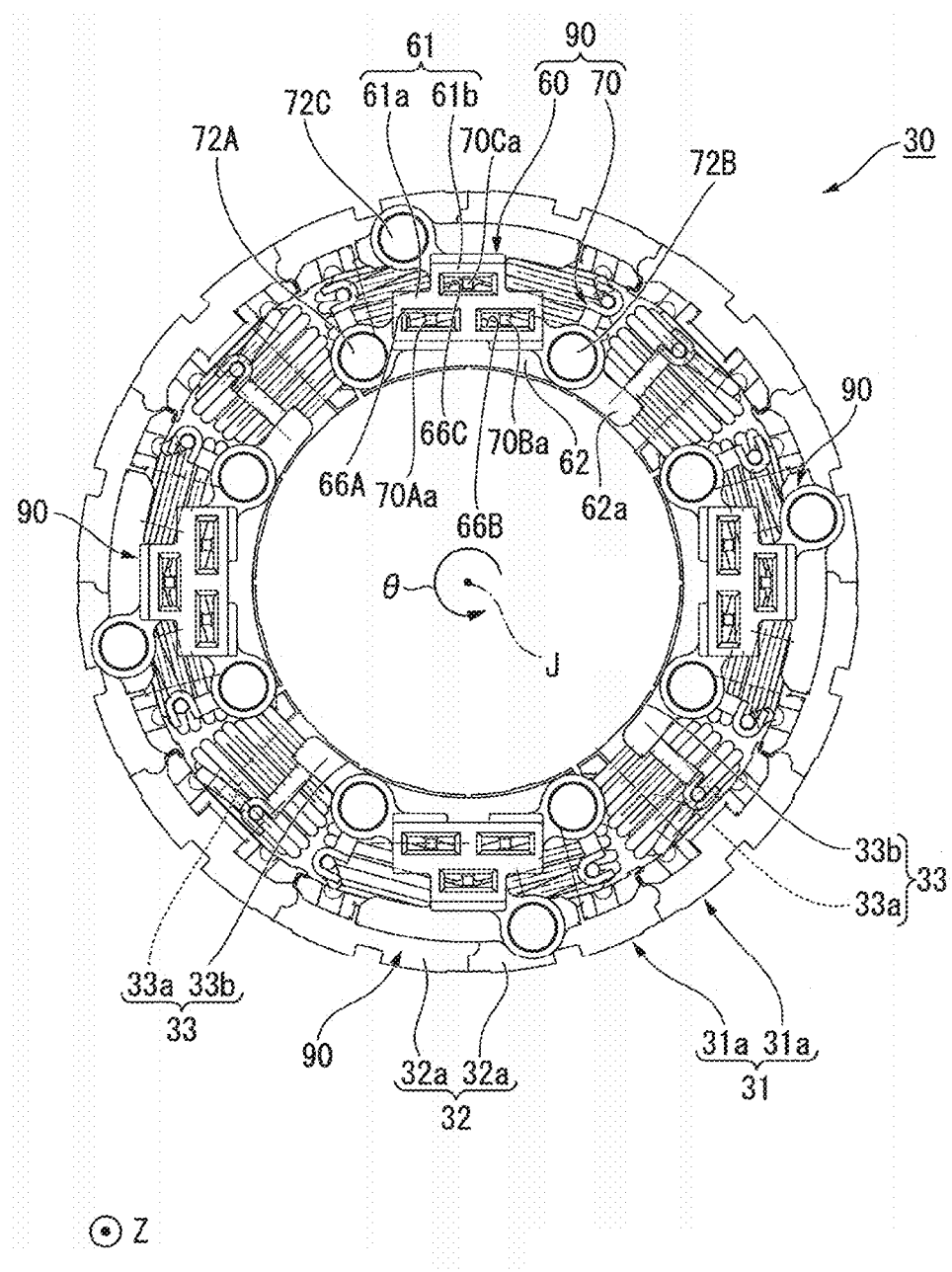
FIG. 3 is a view illustrating a stator and a bus-bar unit according to an example embodiment of the present disclosure, which is seen from the upper side.

As illustrated in FIGS. 2 and 3, the core back 32 extends in the circumferential direction. The core back 32 has a cylindrical or substantially cylindrical shape and is centered on the central axis J. As illustrated in FIG. 1, an outer circumferential surface of the core back 32 is fixed to an inner circumferential surface of the housing 11. As illustrated in FIG. 3, the teeth 33 extend from the core back 32 in the radial direction. More specifically, the teeth 33 extend from an inner circumferential surface of the core back 32 to the radially inner side. The plurality of teeth 33 are disposed at an equal interval over a circumference along the circumferential direction. In the example embodiment of the present disclosure, for example, 12 teeth 33 are provided.

The teeth 33 each have a teeth main body 33a that extends from the core back 32 to the radially inner side and an umbrella part 33b that is connected to a radially inner end part of the teeth main body 33a. The umbrella part 33b protrudes to both sides of the circumferential direction farther than the teeth main body 33a.

In the example embodiment of the present disclosure, the stator core 31 has a plurality of stator core pieces 31a which are distinct members from each other. The stator core 31 has an annular or substantially annular shape configured by connecting the plurality of stator core pieces 31a to each other along the circumferential direction. Each of the stator core pieces 31a has one core back piece 32a and one of the teeth 33. As illustrated in FIG. 2, the core back piece 32a extends in the axial direction and bends along the circumferential direction. The core back piece 32a of each of the stator core pieces 31a is connected to each other along the circumferential direction and thereby constitutes the core back 32. For example, 12 stator core pieces 31a are provided.

The insulators 34 are mounted on the stator core 31. In the example embodiment of the present disclosure, the plurality of insulators 34 are provided. Each of the plurality of insulators 34 is mounted on each of the stator core pieces 31a, respectively. As illustrated in FIG. 1, each of the insulators 34 has an insulator main body 34a, an inner protrusion 34b, and an outer protrusion 34e. The insulator main body 34a has a tubular or substantially tubular shape that opens to both sides of the radial direction. The teeth main body 33a passes through the inside of the insulator main body 34a. The insulator main body 34a covers an upper surface, a lower surface, and both side surfaces in the circumferential direction of the teeth main body 33a.

Figure 4:
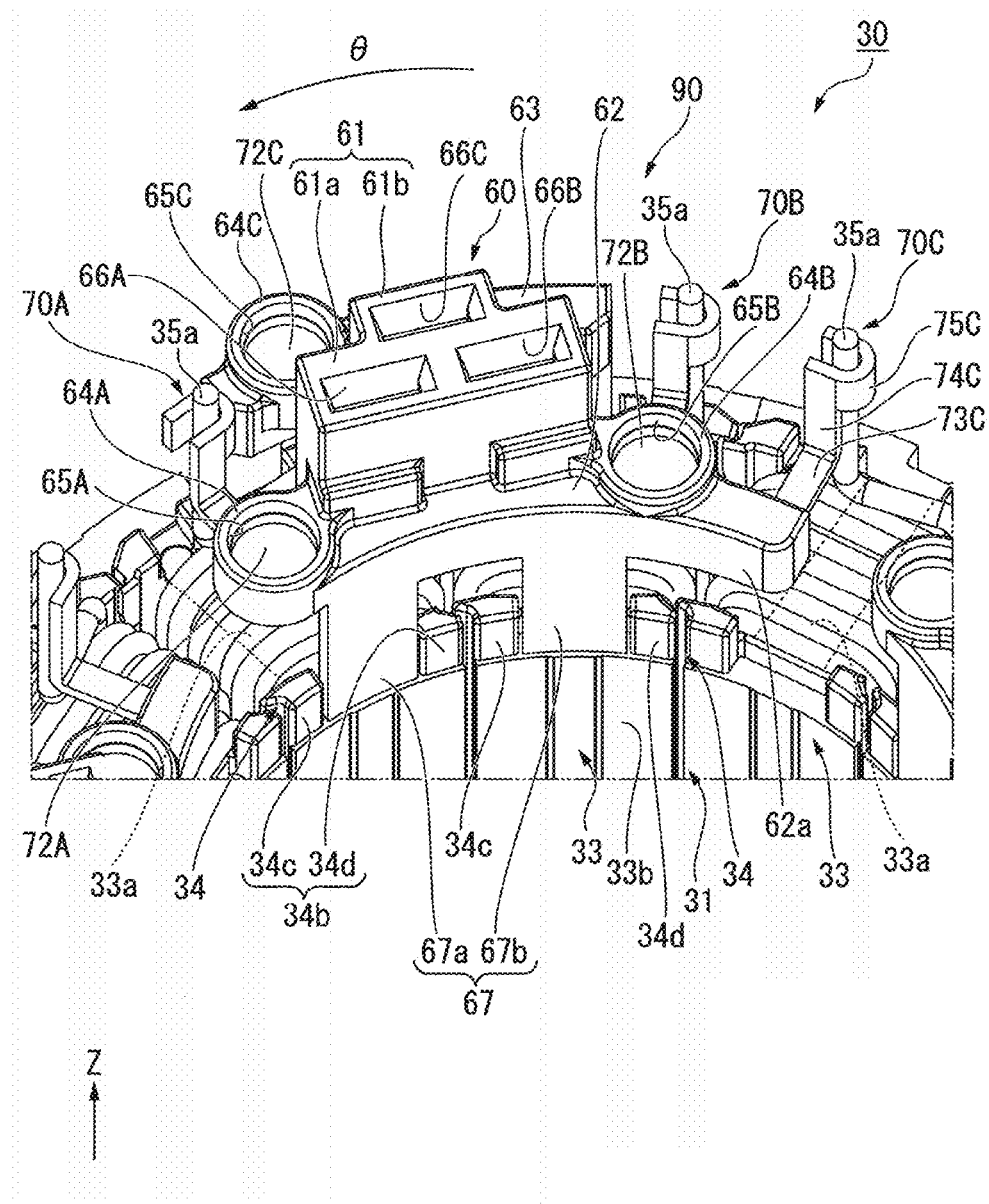
FIG. 4 is a perspective view illustrating a portion of the stator and a portion of a bus-bar unit according to an example embodiment of the present disclosure.

The inner protrusion 34b protrudes from a radially inner end part of the insulator main body 34a to the upper side. As illustrated in FIG. 4, the inner protrusion 34b has one pair of wall parts 34c and 34d. That is, the stator 30 has the pair of wall parts 34c and 34d. The wall part 34c and the wall part 34d are disposed at an interval in the circumferential direction. The wall part 34c is disposed on the upper side of an end part of the umbrella part 33b on one side in the circumferential direction. The wall part 34d is disposed on the upper side of an end part of the umbrella part 33b on the other side in the circumferential direction.

Figure 5:
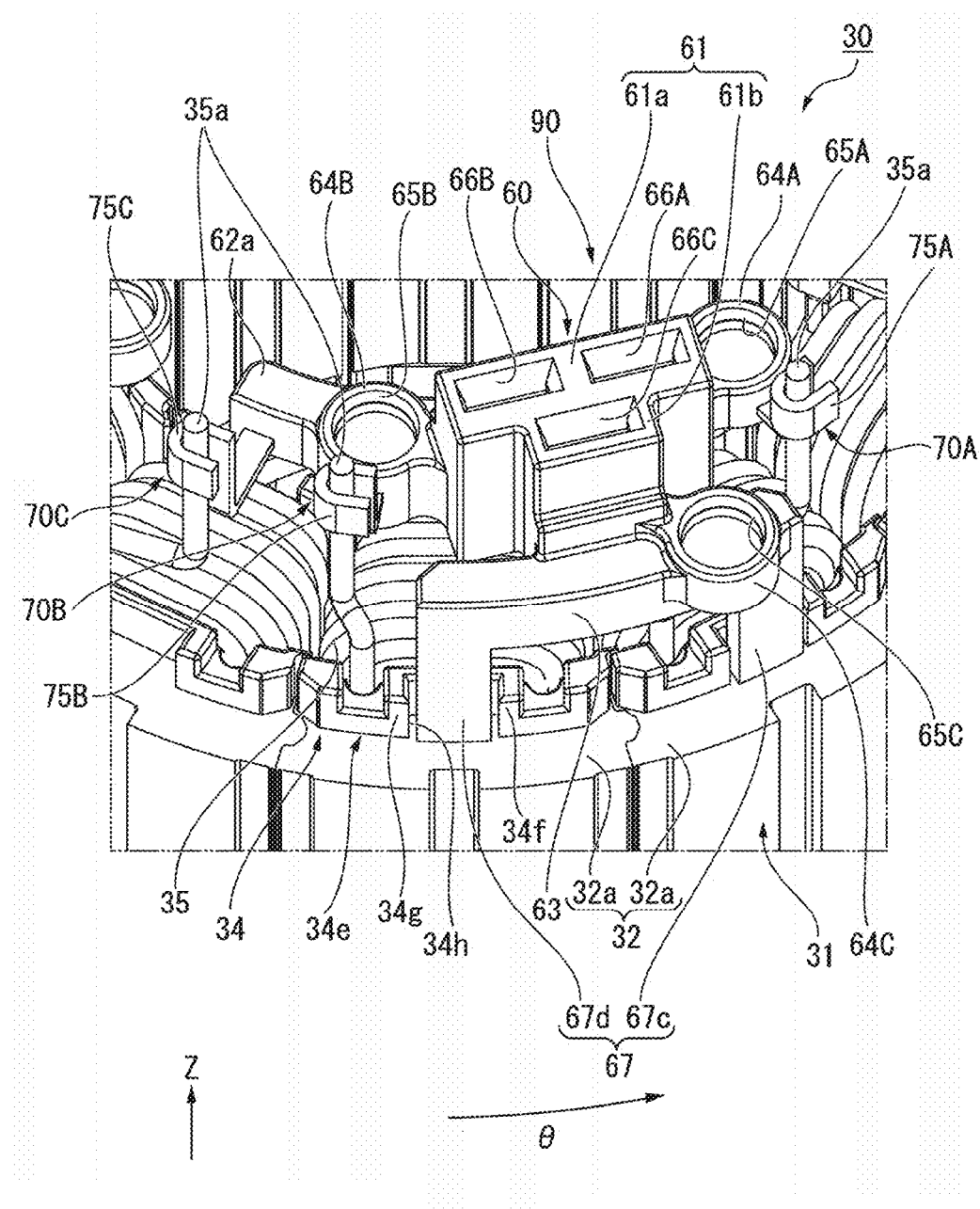
FIG. 5 is a perspective view illustrating a portion of the stator and a portion of the bus-bar unit according to an example embodiment of the present disclosure.

As illustrated in FIG. 1, the outer protrusion 34e protrudes from a radially outer end part of the insulator body 34a to the upper side. As illustrated in FIG. 5, the outer protrusion 34e extends in the circumferential direction. A circumferential dimension of the outer protrusion 34e is almost the same as a circumferential dimension of the core back piece 32a. The outer protrusion 34e is disposed on the upper side of a radially inner end part of the core back piece 32a.

The outer protrusion 34e has a recess 34h sunken from a radially outer surface of the outer protrusion 34e to the radially inner side. The recess 34h is provided at a center part of the outer protrusion 34e in the circumferential direction. The recess 34h penetrates the outer protrusion 34e in the axial direction. By providing the recess 34h, one pair of wall parts 34f and 34g is provided in the outer protrusion 34e with the recess 34h interposed in the circumferential direction. That is, the stator 30 has the pair of wall parts 34f and 34g. The wall part 34f and the wall part 34g are disposed at an interval in the circumferential direction.

As illustrated in FIGS. 1 to 3, the plurality of coils 35 are mounted on the plurality of teeth 33 via the insulators 34, respectively. Accordingly, twelve of the plurality of coils 35 are disposed at an equal interval over the circumference along the circumferential direction in the example embodiment of the present disclosure. Each of the coils 35 is constituted by a conducting wire being wound around the teeth main body 33a via the insulator main body 34a. As illustrated in FIG. 2, a coil lead wire 35a is led out to the upper side from each of the coils 35. The coil lead wire 35a is a conducting wire extending from the coil 35, and is an end part of the conducting wire constituting the coils 35.

The plurality of coils 35 constitute a plurality of coil groups having power systems different from each other. In the example embodiment of the present disclosure, for example, there are four coil groups having power systems different from each other. That is, the motor 10 of the example embodiment of the present disclosure has, for example, four power systems. For example, three of the coils 35 are included in each of the coil groups. In the example embodiment of the present disclosure, the coils 35 included in each of the coil groups are disposed to be adjacent to each other in the circumferential direction.

In the present disclosure, "power systems for subjects are different from each other" means that power is independently supplied to a subject per power system. For example, in the example embodiment of the present disclosure, three-phase alternating current power is supplied independently to the coils 35 in the coil groups having power system different from power system of the other coil groups.

As illustrated in FIG. 1, the control device 80 has a control device main body 81, and a plurality of power supply terminal parts 82 protruding from the control device main body 81 downwardly. The control device main body 81 is disposed at an end part on the upper side in the housing 11. In the example embodiment of the present disclosure, the control device 80 is an electrical component, and is a power supply device that supplies power to the stator 30. The control device 80 supplies power to the stator 30 via the power supply terminal parts 82.

The power supply terminal parts 82 are provided for each power system. In the example embodiment of the present disclosure, four power supply terminal parts 82 are provided. Each of the power supply terminal parts 82 is connected to each of the bus-bar units 90, respectively. Each of the power supply terminal parts 82 has three terminals 82a extending downwardly. The three terminals 82a are terminals that supply U-phase, V-phase, and W-phase currents respectively. The control device 80 may supply three-phase alternating current power independently for each power system via the power supply terminal parts 82 of each power system.

The bus-bar units 90 are disposed on the upper side of the stator 30. Each of the bus-bar units 90 has a bus-bar holder 60 and a bus-bar 70. That is, the motor 10 includes the bus-bar holders 60 and the bus-bars 70. As illustrated in FIG. 2, the plurality of bus-bar units 90 are provided at an interval from each other in the circumferential direction. That is, the plurality of bus-bar holders 60 and the plurality of bus-bars 70 are provided. In the example embodiment of the present disclosure, the shape of each of the bus-bar units 90 is equal to each other. That is, the shape of each of the bus-bar holders 60 in each of the bus-bar units 90 is equal to each other. In each of the bus-bar units 90, the shape of each of the bus-bars 70 is equal to each other. For this reason, it is easy to manufacture the plurality of bus-bar units 90 compared to a case where the shapes are different from each other.

The bus-bar holders 60 are disposed on the upper side of the stator 30, and are supported by the stator 30 from the lower side. The plurality of bus-bar holders 60 are disposed along the circumferential direction. The plurality of bus-bar holders 60 are distinct members separate from each other. The plurality of bus-bar holders 60 are disposed at an interval from each other in the circumferential direction. In the example embodiment of the present disclosure, the plurality of bus-bar holders 60 are disposed at an equal interval over the circumference along the circumferential direction. In FIG. 2, four of the bus-bar units 90 and four of the bus-bar holders 60 are provided.

Figure 6:
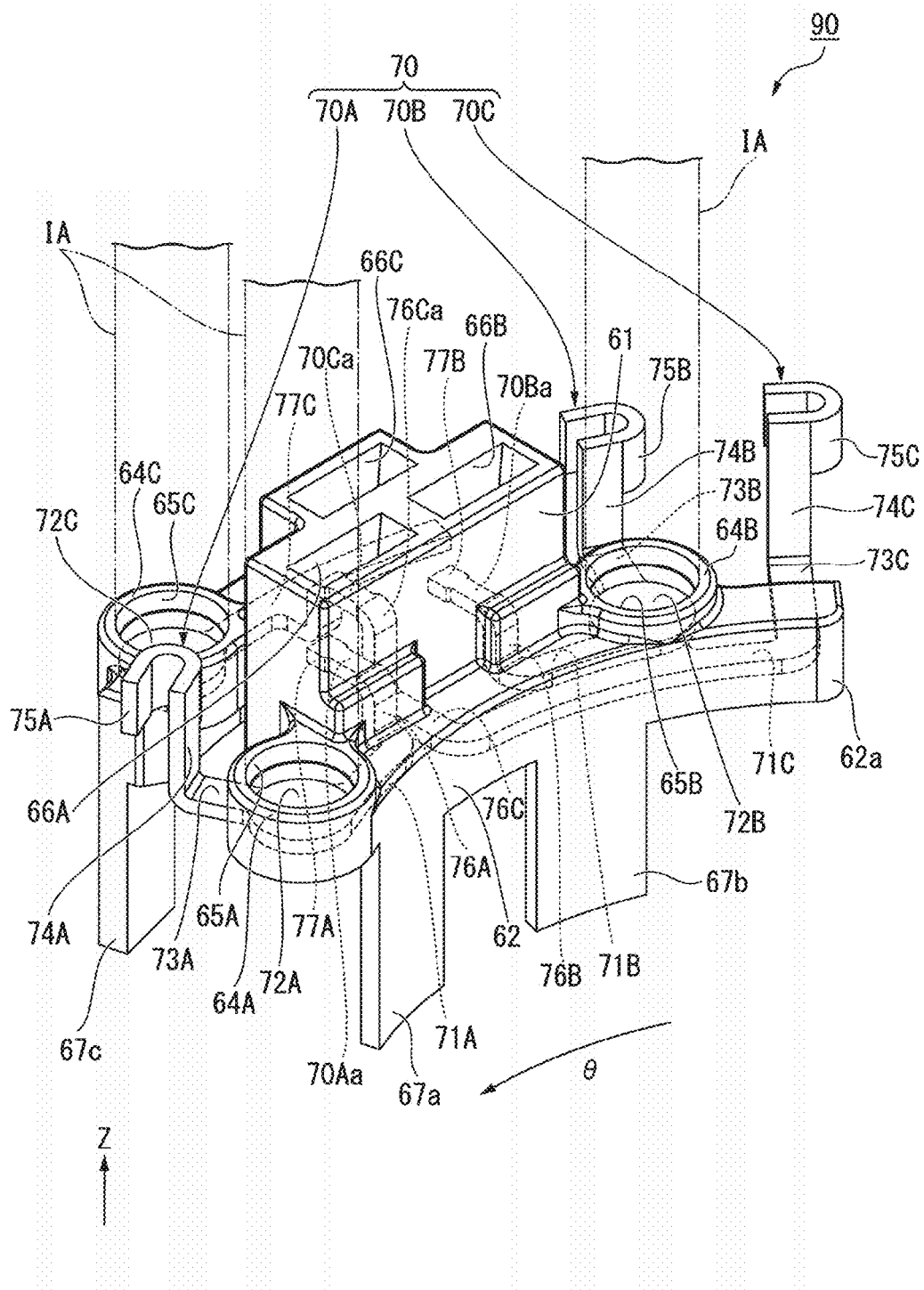
FIG. 6 is a perspective view illustrating a bus-bar unit according to an example embodiment of the present disclosure.

Each of the bus-bar holders 60 has at least one bus-bar 70 different from each other. In the example embodiment of the present disclosure, each of the bus-bar holders 60 holds two or more bus-bars 70. Accordingly, a large number of bus-bars 70 can be held by a relatively small number of bus-bar holders 60. As illustrated in FIG. 6, each of the bus-bar holders 60 holds three bus-bars 70 in the example embodiment of the present disclosure.

As illustrated in FIGS. 4 and 5, each of the bus-bar holders 60 has a base part 61, an inner curved part 62, an outer curved part 63, a supported part 67, and tubular parts 64A, 64B, and 64C. The base part 61 has a first base part 61a and a second base part 61b. Both the first base part 61a and the second base part 61b have a substantially rectangular parallelepiped shape. As illustrated in FIG. 3, both a shape of the first base part 61a seen from the upper side and a shape of the second base part 61b seen from the upper side each are a rectangular or substantially rectangular shape which is long in a direction orthogonal to the radial direction and the axial direction. In the direction orthogonal to the radial direction and the axial direction, a dimension of the second base part 61b is smaller than a dimension of the first base part 61a. The second base part 61b protrudes from a center of the first base part 61a in the circumferential direction to the radially outer side.

The inner curved part 62 extends in the circumferential direction. As illustrated in FIG. 4, the inner curved part 62 is connected to a lower end part of a radially inner end part of the first base part 61a. The inner curved part 62 has an arm part 62a. That is, the bus-bar holder 60 has the arm part 62a. The arm part 62a is an end part of the inner curved part 62 on the other side in the circumferential direction. The arm part 62a protrudes in the other side in the circumferential direction farther than the base part 61. The arm part 62a extends from the upper side of the teeth 33 which support the supported part 67, to the upper side of the teeth 33 adjacent in the circumferential direction with respect to the teeth 33 which support the supported part 67. More specifically, the arm part 62a extends to the upper side of the teeth 33 which does not support the bus-bar unit 90 from the lower side. The arm part 62a is disposed on the upper side of a radially inner end part of the teeth 33.

As illustrated in FIG. 5, the outer curved part 63 extends in the circumferential direction. The outer curved part 63 is connected to a lower end part of radially outer end parts of the second base part 61b. The outer curved part 63 protrudes more to both sides of the circumferential direction farther than the second base part 61b.

The supported part 67 is in contact with the stator 30 and is supported by the stator 30 from the lower side. The supported part 67 is in contact with an upper end part of the stator core 31, and is directly supported by the stator core 31 from the lower side. As illustrated in FIGS. 4 and 5, the supported part 67 includes first supported parts 67a and 67b and second supported parts 67c and 67d. That is, a plurality of first supported parts and the plurality of second supported parts are provided, respectively in the example embodiment of the present disclosure.

As illustrated in FIG. 4, the first supported parts 67a and 67b protrude from a radially inner end part downwardly in the inner curved part 62. Both the first supported parts 67a and 67b of which a plate surface is orthogonal to the radial direction have a substantially rectangular plate shape. The first supported parts 67a and 67b are curve along the circumferential direction. Radially inner surfaces of the first supported parts 67a and 67b are disposed at the same position in the radial direction as a radially inner surface of the inner curved part 62. The first supported part 67a and the first supported part 67b are disposed at an interval in the circumferential direction. That is, the plurality of supported parts 67 are provided along the circumferential direction.

The first supported parts 67a and 67b are supported at the teeth 33 from the lower side. More specifically, lower end parts of the first supported parts 67a and 67b are in contact with upper end parts of the umbrella parts 33b and are supported from the lower side. Accordingly, the first supported parts 67a and 67b are in contact with the upper end part of the stator core 31 on the radially inner side inner than the coils 35. The teeth 33 that support the first supported part 67a and the teeth 33 that support the first supported part 67b are different from each other. Accordingly, the plurality of first supported parts include at least two first supported parts 67a and 67b that are supported by the stator core pieces 31a different from each other. The teeth 33 that support the first supported part 67a and the teeth 33 that support the first supported part 67b are adjacent to each other in the circumferential direction.

Lower parts of the first supported parts 67a and 67b are disposed between the pairs of wall parts 34c and 34d in the circumferential direction. Accordingly, the wall parts 34c and 34d are disposed on at least one side of both sides of the first supported parts 67a and 67b in the circumferential direction. Therefore, for example, by bringing the first supported parts 67a and 67b into contact with the wall parts 34c and 34d in the circumferential direction, the first supported parts 67a and 67b may be positioned in the circumferential direction, and the bus-bar holder 60 may be positioned in the circumferential direction.

In the example embodiment of the present disclosure, one pair of the wall parts 34c and 34d is disposed on both sides of the first supported parts 67a and 67b in the circumferential direction. Therefore, due to the pair of the wall parts 34c and 34d, the bus-bar holder 60 may be positioned in the circumferential direction, and a large shift in a circumferential position of the bus-bar holder 60 may be restrained.

One of the insulators 34, which has the wall parts 34c and 34d disposed on both sides of the first supported part 67a in the circumferential direction and the other of the insulators 34, which has the wall parts 34c and 34d disposed on both sides of the first supported part 67b in the circumferential direction are different from each other. Circumferential dimensions of the first supported parts 67a and 67b are smaller than a distance between one pair of wall parts 34c and 34d in the circumferential direction. In FIG. 4, a gap is provided between the first supported part 67a or 67b and the wall part 34c in the circumferential direction, and a gap is provided between the first supported part 67a or 67b and the wall part 34d in the circumferential direction.

As illustrated in FIG. 5, the second supported parts 67c and 67d protrude from a radially outer end part downwardly in the outer curved part 63. The second supported part 67c protrudes from an end part of one side in the circumferential direction of the outer curved part 63 downwardly. The second supported part 67d protrudes from an end part of the other side in the circumferential direction of the outer curved part 63 downwardly. Both the second supported parts 67c and 67d of which a plate surface is orthogonal to the radial direction have a substantially rectangular plate shape. The second supported parts 67c and 67d are curve along the circumferential direction. Radially outer surfaces of the second supported parts 67c and 67d are disposed at the same position in the radial direction as a radially outer surface of the outer curved part 63. The second supported part 67c and the second supported part 67d are disposed at an interval in the circumferential direction.

The second supported parts 67c and 67d are supported by the core back 32 from the lower side. Accordingly, the second supported parts 67c and 67d are in contact with the upper end part of the stator core 31 on the radially outer side outer than the coils 35.

As described above, the bus-bar holders 60 are directly supported by the stator core 31 via the plurality of supported parts 67 in the example embodiment of the present disclosure. For this reason, even in a case where a load in the axial direction is applied to the bus-bar holders 60, the stator core 31 may receive the load. Accordingly, it is possible to prevent a load from being applied to the insulators 34. Therefore, damage to the insulators 34 may be restrained. In addition, the stator core 31 supports the bus-bar holders 60 from both sides of the coils in the radial direction by interposing the first supported parts 67a and 67b and the second supported parts 67c and 67d. For this reason, the bus-bar holders 60 may be stably supported. Therefore, the motor 10 having a structure that may restrain the insulators 34 from being damaged and may stably support the bus-bar holders 60 is obtained in the example embodiment of the present disclosure.

For example, in a case where only one bus-bar holder is provided, the bus-bar holder may have an annular or substantially annular shape in some cases. In this case, even when the bus-bar holder is supported only on one side in the radial direction of the coils 35, the bus-bar holder may be disposed on the upper side of the stator 30 in some cases.

However, in a case where the plurality of bus-bar holders 60 are provided as distinct members separate from each other as indicated in the example embodiment of the present disclosure, the bus-bar holders 60 tilt and fall down to the other side in the radial direction as long as the bus-bar holders 60 are supported only on one side in the radial direction. Thus, the bus-bar holders 60 may not be disposed on the upper side of the stator 30 in some cases. On the contrary, since the bus-bar holders 60 are supported on both sides of the coils 35 in the radial direction in the example embodiment of the present disclosure, the bus-bar holders 60 may be stably disposed on the upper side of the stator 30 even in a case where the plurality of bus-bar holders 60 are provided as distinct members separate from each other.

One core back piece 32a that supports the second supported part 67c and the other core back piece 32a that supports the second supported part 67d are different. Accordingly, the plurality of second supported parts include at least two second supported parts 67c and 67d that are supported by the stator core pieces 31a different from each other. The core back piece 32a that supports the second supported part 67c and the core back piece 32a that supports the second supported part 67d are adjacent to each other in the circumferential direction.

Since the plurality of first supported parts 67a and 67b and the plurality of second supported parts 67c and 67d are supported by the stator core 31, the bus-bar holders 60 may be more stably supported in the example embodiment of the present disclosure. In addition, the plurality of first supported parts 67a and 67b and the plurality of second supported parts 67c and 67d are supported by the plurality of stator core pieces 31a different from each other, respectively. For this reason, parts to be supported by the stator core 31 in each of the bus-bar holders 60, that is, the supported parts 67 may be detached from each other in the circumferential direction. Therefore, the bus-bar holders 60 may be more stably supported.

The core back piece 32a that supports the second supported part 67c is the core back piece 32a of the stator core piece 31a that has the teeth 33 which support the first supported part 67a. The core back piece 32a that supports the second supported part 67d is the core back piece 32a of the stator core piece 31a that has the teeth 33 which supports the first supported part 67b. As described above, the bus-bar holder 60 is supported from the lower side by two stator core pieces 31a adjacent to each other in the circumferential direction in the example embodiment of the present disclosure.

In the example embodiment of the present disclosure, since four bus-bar holders 60 are provided, the number of the stator core pieces 31a that support the four bus-bar holders 60 is eight in total. Since the number of the stator core pieces 31a which are provided is twelve in total, only some of the stator core pieces 31a support the bus-bar holders 60. That is, the teeth 33 that support the supported parts 67 are only some of the plurality of teeth 33.

Lower parts of the second supported parts 67c and 67d are inserted into the recesses 34h. Accordingly, the lower parts of the second supported parts 67c and 67d are disposed between one pair of wall parts 34f and 34g in the circumferential direction. That is, one pair of wall parts 34f and 34g are disposed on both sides of the second supported parts 67c and 67d in the circumferential direction. One of the insulators 34, which has the wall parts 34f and 34g disposed on both sides of the second supported part 67c in the circumferential direction and the other insulator of the insulators 34, which has the wall parts 34f and 34g disposed on both sides of the second supported part 67d in the circumferential direction are different. Circumferential dimensions of the second supported parts 67c and 67d are smaller than a distance between one pair of wall parts 34f and 34g in the circumferential direction. The circumferential dimensions of the second supported parts 67c and 67d are smaller than the dimensions of the first supported parts 67a and 67b in the circumferential direction. In FIG. 5, a gap is provided between the second supported part 67c or 67d and the wall part 34f in the circumferential direction, and a gap is provided between the second supported part 67c or 67d and the wall part 34g in the circumferential direction.

As described above, at least one gap is provided between the wall part 34c or 34d and the first supported part 67a or 67b in the circumferential direction. At least one gap is provided between the wall part 34f or 34g and the second supported part 67c or 67d in the circumferential direction. Accordingly, the first supported parts 67a and 67b and the second supported parts 67c and 67d are movable in the circumferential direction by the size of the gap, respectively. Accordingly, it is easy to dispose the entire bus-bar holders 60 so as to be movable in the circumferential direction. In FIGS. 4 and 5, the gaps are provided in all parts between the wall parts 34c, 34d, 34f, and 34g and the supported parts 67 in the circumferential direction. Therefore, the bus-bar holders 60 are disposed so as to be movable in the circumferential direction by the size of the gap between the wall parts 34c, 34d, 34f, and 34g and the supported parts 67 in the circumferential direction.

The tubular parts 64A, 64B, and 64C have a tubular or substantially tubular shape that is open to the upper side. More specifically, the tubular parts 64A, 64B, and 64C have a cylindrical or substantially cylindrical shape that is open to the upper side. As illustrated in FIG. 4, the tubular parts 64A and 64B are provided on the inner curved part 62, and protrude to the upper side farther than an upper surface of the inner curved part 62. The tubular part 64A is disposed on an end part of one side in the circumferential direction of the inner curved part 62. The tubular part 64A is disposed on the one side in the circumferential direction farther than of the base part 61. An end part of the tubular part 64A on one side in the circumferential direction is disposed on one side in the circumferential direction of the first supported part 67a.

The tubular part 64B is disposed on a part of the inner curved part 62 on the other side in the circumferential direction. The tubular part 64B is disposed on the other side in the circumferential direction farther than the base part 61. An end part of the tubular part 64B on the other side in the circumferential direction is disposed on the other side in the circumferential direction farther than the first supported part 67b, and on one side in the circumferential direction farther than an end part of the arm part 62a on the other side in the circumferential direction. Radially inner end parts of the tubular parts 64A and 64B are disposed at the position in the radial direction, which is identical with the position of a radially inner end part of the inner curved part 62 in the radial direction. Radially outer end parts of the tubular parts 64A and 64B protrude outwardly in the radial direction farther than the inner curved part 62.

As illustrated in FIG. 5, the tubular part 64C is disposed on a part of the outer curved part 63 on one side in the circumferential direction. The tubular part 64C is disposed on one side in the circumferential direction farther than the second base part 61b. The tubular part 64C is disposed on the other side in the circumferential direction farther than an end part of the second supported part 67c on one side in the circumferential direction. A part of the tubular part 64C overlaps with the second supported part 67c when seen from the upper side. A radially outer end part of the tubular part 64C protrudes outwardly in the radial direction farther than the outer curved part 63 and the second supported parts 67c and 67d. A part of the tubular part 64C overlaps with the first base part 61a when seen along a radial direction to which the second base part 61b protrudes from the first base part 61a among the radial directions.

Upper end parts of each of the tubular parts 64A, 64B, and 64C are disposed at the same position in the axial direction. Hole parts 65A, 65B, and 65C recessed from the upper side to the lower side are provided as the tubular parts 64A, 64B, and 64C are provided. That is, the bus-bar holder 60 has the hole parts 65A, 65B, and 65C. The inside of the hole part 65A is constituted by the inside of the tubular part 64A. The inside of the hole part 65B is constituted by the inside of the tubular part 64B. The inside of the hole part 65C is constituted by the inside of the tubular part 64C. Shapes of the hole parts 65A, 65B, and 65C seen from the upper side are a circular or substantially circular shape.

The bus-bar holder 60 has insertion hole parts 66A, 66B, and 66C recessed from the upper side to the lower side. As illustrated in FIG. 1, the insertion hole part 66C penetrates the bus-bar holder 60 in the axial direction. Although illustration is omitted, the insertion hole parts 66A and 66B also penetrate the bus-bar holder 60 in the axial direction. As illustrated in FIG. 4, the insertion hole parts 66A, 66B, and 66C are provided in the base part 61. More specifically, the insertion hole parts 66A and 66B are provided in the first base part 61a. The insertion hole part 66C is provided in the second base part 61b. The insertion hole part 66A and the insertion hole part 66B are disposed side by side along a longitudinal direction of the first base part 61a. The insertion hole part 66B is disposed on the other side in the circumferential direction farther than the insertion hole part 66A. The insertion hole part 66C is disposed on the radially outer side of a part between the insertion hole part 66A and the insertion hole part 66B. The insertion hole parts 66A, 66B, and 66C have a rectangular or substantially rectangular shape which is long in the longitudinal direction of the first base part 61a when seen from the upper side.

As illustrated in FIG. 6, each of the bus-bars 70 has, for example, a plate or a substantially plate shape that is made by bending a plate member punched by pressing. A part of each of the bus-bars 70 is buried in the bus-bar holder 60 and an upper side thereof is covered with the bus-bar holder 60. Accordingly, the bus-bar holder 60 holds the bus-bars 70. In the example embodiment of the present disclosure, three bus-bars 70 held on each of the bus-bar holders 60 are phase bus-bars electrically connected to the control device 80.

The phase bus-bars include a first phase bus-bar 70A, a second phase bus-bar 70B and a third phase bus-bar 70C for each power system. In the example embodiment of the present disclosure, each of the bus-bar holders 60 holds the first phase bus-bar 70A, the second phase bus-bar 70B, and the third phase bus-bar 70C in one power system as three bus-bars 70. That is, the bus-bars 70 held on one bus-bar holder 60 are three phase bus-bars having the same power system in the example embodiment of the present disclosure.

The first phase bus-bar 70A has a circumferentially extended part 71A, an inspection unit 72A, a first radially extended part 73A, a first axially extended part 74A, a coil connecting part 75A, a second axially extended part 76A, and a second radially extended part 77A. The circumferentially extended part 71A extends in the circumferential direction. The circumferentially extended part 71A has a plate or substantially plate shape of which a plate surface is orthogonal to the axial direction. The entire circumferentially extended part 71A is buried in a part of the inner curved part 62 on one side in the circumferential direction.

The inspection unit 72A is connected to an end part of the circumferentially extended part 71A on one side in the circumferential direction. The inspection unit 72A has a disk or substantially disk shape of which a plate surface is orthogonal to the axial direction. That is, the inspection unit 72A has a circular or substantially circular shape when seen from the upper side. An outer diameter of the inspection unit 72A is larger than a dimension of the circumferentially extended part 71A in the radial direction. The inspection unit 72A is provided on a bottom part of the tubular part 64A. The inspection unit 72A is exposed to the inside of the tubular part 64A. The inspection unit 72A constitutes at least a part of a bottom surface of the hole part 65A. In the example embodiment of the present disclosure, the entire bottom surface of the hole part 65A is constituted as an upper surface of the inspection unit 72A. Accordingly, the inspection unit 72A is exposed to the upper side of the bus-bar holder 60 via the hole part 65A.

The first radially extended part 73A extends from the inspection unit 72A to the radially outer side. The first radially extended part 73A has a plate or substantially plate shape of which a plate surface is orthogonal to the axial direction. The first radially extended part 73A protrudes from a lower end part of the tubular part 64A to the outside of the bus-bar holder 60. The first axially extended part 74A extends from a radially outer end part of the first radially extended part 73A to the upper side. The first axially extended part 74A extends to the upper side farther than the tubular part 64A. The first axially extended part 74A has a plate or substantially plate shape of which a plate surface is orthogonal to the radial direction.

The coil connecting part 75A is connected to an upper end part of the first axially extended part 74A. Accordingly, the coil connecting part 75A is connected to a proximal end part of the first radially extended part 73A in the radial direction via the first axially extended part 74A. The coil connecting part 75A has a U-shape or a substantially U-shape that is open to one side in the circumferential direction when seen from the upper side. The coil connecting part 75A is constituted by bending a plate-shaped part of which a plate surface is parallel to the axial direction. The coil connecting part 75A is exposed to the outside of the bus-bar holder 60.

The second axially extended part 76A extends from an end part of the circumferentially extended part 71A on the other side in the circumferential direction to the upper side. The second axially extended part 76A has a plate or substantially plate shape of which a plate surface is orthogonal to the radial direction. The second radially extended part 77A extends outwardly in the radial direction from an upper end part of the second axially extended part 76A. The second radially extended part 77A has a plate or substantially plate shape of which a plate surface is orthogonal to the axial direction. The second radially extended part 77A penetrates the inside of the insertion hole part 66A in the radial direction.

The second radially extended part 77A has a connection terminal part 70Aa. That is, the first phase bus-bar 70A has the connection terminal part 70Aa. The connection terminal part 70Aa is a middle part of the second radially extended part 77A in the radial direction. The connection terminal part 70Aa is disposed inside the insertion hole part 66A. Accordingly, the connection terminal part 70Aa is exposed to the outside of the bus-bar holder via the insertion hole part 66A.

Figure 7:
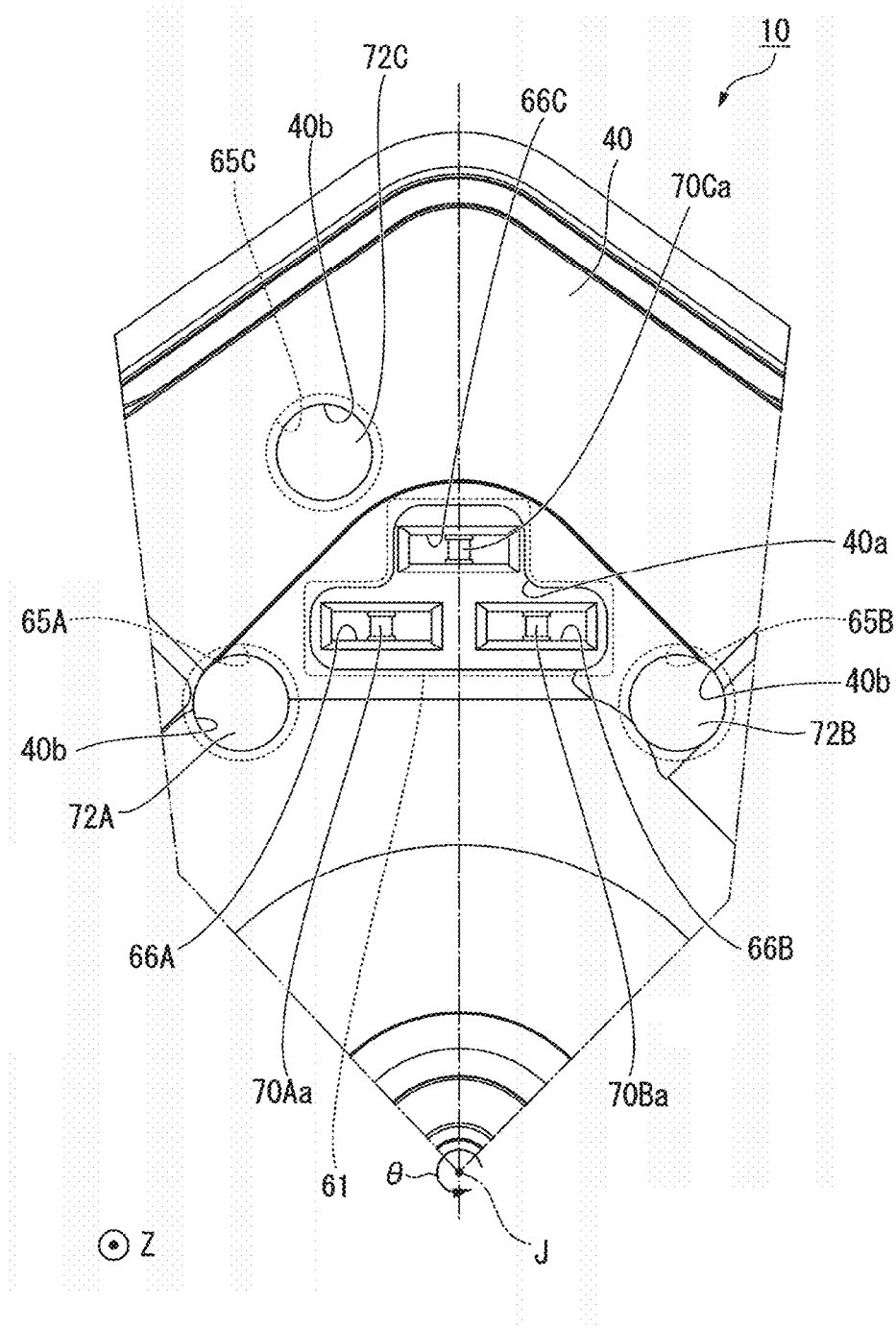
FIG. 7 is a view illustrating a portion of a motor according to an example embodiment of the present disclosure, which is seen from the upper side a bearing holder.

More specifically, as illustrated in FIG. 7, the connection terminal part 70Aa is exposed to the upper side of the bus-bar holder 60. As illustrated in FIG. 6, a width of the connection terminal part 70Aa is smaller than that of the other parts of the second radially extended part 77A.

At least some parts of a part of the first phase bus-bar 70A from the inspection unit 72A to the connection terminal part 70Aa, and at least some parts of a part of the first phase bus-bar 70A from the inspection unit 72A to the coil connecting part 75A are buried in the bus-bar holder 60, and the upper sides thereof are covered with the bus-bar holder 60. In the example embodiment of the present disclosure, the entire part of the first phase bus-bar 70A from the inspection unit 72A to the connection terminal part 70Aa is buried in the bus-bar holder 60 and the upper side thereof is covered with the bus-bar holder 60. In the part of the first phase bus-bar 70A from the inspection unit 72A to the coil connecting part 75A, A part of the first radially extended part 73A on the radially inner side inspection unit is buried in the bus-bar holder 60, and the upper side thereof is covered with the bus-bar holder 60.

The second phase bus-bar 70B has a circumferentially extended part 71B, an inspection unit 72B, a first radially extended part 73B, a first axially extended part 74B, a coil connecting part 75B, a second axially extended part 76B, and a second radially extended part 77B. The circumferentially extended part 71B extends in the circumferential direction. The circumferentially extended part 71B has a plate or substantially plate shape of which a plate surface is orthogonal to the axial direction. The entire circumferentially extended part 71B is buried in a part on the other side in the circumferential direction farther than a part of the inner curved part 62, in which the circumferentially extended part 71A is buried. The circumferentially extended part 71B is disposed detachedly on the other side in the circumferential direction of the circumferentially extended part 71A. The circumferentially extended part 71B is disposed at the position identical with the position of the circumferentially extended part 71A in the axial direction.

The inspection unit 72B is connected to an end part of the circumferentially extended part 71B on the other side in the circumferential direction. The inspection unit 72B has a disk or substantially disk shape of which a plate surface is orthogonal to the axial direction. That is, the inspection unit 72B has a circular or substantially circular shape when seen from the upper side. An outer diameter of the inspection unit 72B is larger than a dimension of the circumferentially extended part 71B in the radial direction. The inspection unit 72B is provided on a bottom part of the tubular part 64B. The inspection unit 72B is exposed to the inside of the tubular part 64B. The inspection unit 72B constitutes at least a part of a bottom surface of the hole part 65B. In the example embodiment of the present disclosure, the entire bottom surface of the hole part 65B is constituted as an upper surface of the inspection unit 72B. Accordingly, the inspection unit 72B is exposed to the upper side of the bus-bar holder 60 via the hole part 65B.

The first radially extended part 73B extends outwardly in the radial direction from the inspection unit 72B. The first radially extended part 73B has a plate or substantially plate shape of which a plate surface is orthogonal to the axial direction. The first radially extended part 73B protrudes from a lower end part of the tubular part 64B to the outside of the bus-bar holder 60. The first axially extended part 74B extends from a radially outer end part of the first radially extended part 73B to the upper side. The first axially extended part 74B extends to the upper side farther than the tubular part 64B. The first axially extended part 74B has a plate or substantially plate shape of which a plate surface is orthogonal to the radial direction.

The coil connecting part 75B is connected to an upper end part of the first axially extended part 74B. Accordingly, the coil connecting part 75B is connected to a proximal end part of the first radially extended part 73B in the radial direction via the first axially extended part 74B. A shape of the coil connecting part 75B is the same as a shape of the coil connecting part 75A. The coil connecting part 75B is exposed to the outside of the bus-bar holder 60.

The second axially extended part 76B extends from an end part of the circumferentially extended part 71B on one side in the circumferential direction to the upper side. The second axially extended part 76B has a plate or substantially plate shape of which a plate surface is orthogonal to the radial direction. The second radially extended part 77B extends from an upper end part of the second axially extended part 76B to the radially outer side. The second radially extended part 77B has a plate or substantially plate shape of which a plate surface is orthogonal to the axial direction. The second radially extended part 77B penetrates the inside of the insertion hole part 66B in the radial direction.

The second radially extended part 77B has a connection terminal part 70Ba. That is, the second phase bus-bar 70B has the connection terminal part 70Ba. The connection terminal part 70Ba is a middle part of the second radially extended part 77B in the radial direction. The connection terminal part 70Ba is disposed inside the insertion hole part 66B. Accordingly, the connection terminal part 70Ba is exposed to the outside of the bus-bar holder 60 via the insertion hole part 66B. More specifically, as illustrated in FIG. 7, the connection terminal part 70Ba is exposed to the upper side of the bus-bar holder 60. As illustrated in FIG. 6, a width of the connection terminal part 70Ba is smaller than that of other parts of the second radially extended part 77B.

At least some parts of a part of the second phase bus-bar 70B from the inspection unit 72B to the connection terminal part 70Ba and at least some parts of a part of the second phase bus-bar 70B from the inspection unit 72B to the coil connecting part 75B are buried in the bus-bar holder 60, and the upper sides thereof are covered with the bus-bar holder 60. In the example embodiment of the present disclosure, the entire part of the second phase bus-bar 70B from the inspection unit 72B to the connection terminal part 70Ba is buried in the bus-bar holder 60, and the upper side thereof is covered with the bus-bar holder 60. In the portion of the second phase bus-bar 70B from the inspection unit 72B to the coil connecting part 75B, a part of the first radially extended part 73B on the radially inner side inspection unit is buried in the bus-bar holder 60 and the upper side thereof is covered with the bus-bar holder 60.

The third phase bus-bar 70C has a first circumferentially extended part 71C, a first radially extended part 73C, an axially extended part 74C, a coil connecting part 75C, a second radially extended part 76C, a second circumferentially extended part 77C, and an inspection unit 72C. The first circumferentially extended part 71C extends in the circumferential direction. The first circumferentially extended part 71C has a plate or substantially plate shape of which a plate surface is orthogonal to the axial direction. The entire first circumferentially extended part 71C is buried in the part of the inner curved part 62 on the other side in the circumferential direction.

An end part of the first circumferentially extended part 71C on one side in the circumferential direction is disposed between the circumferentially extended part 71A and the circumferentially extended part 71B in the circumferential direction. An end part of the first circumferentially extended part 71C on the other side in the circumferential direction extends to the end part of the arm part 62a on the other side in the circumferential direction, and is disposed on the other side in the circumferential direction farther than the circumferentially extended part 71B.

The first circumferentially extended part 71C is disposed on the lower side of the circumferentially extended parts 71A and 71B. The first circumferentially extended part 71C overlaps with the circumferentially extended part 71B when seen along the axial direction. That is, out of two or more of the bus-bars 70 held on the bus-bar holder 60, at least two of the bus-bars 70 have parts overlapping with each other when seen along the axial direction. For this reason, it is easy to miniaturize the bus-bar holder 60 in the radial direction.

The first radially extended part 73C extends from the end part of the first circumferentially extended part 71C on the other side in the circumferential direction to the radially outer side. The first radially extended part 73C has a plate or substantially plate shape of which a plate surface is orthogonal to the axial direction. The first radially extended part 73C protrudes from the end part of the arm part 62a on the other side in the circumferential direction to the outside of the bus-bar holder 60. That is, the first radially extended part 73C is a radially extended part that extends in the radial direction from a proximal end part of the arm part 62a in the circumferential direction. The axially extended part 74C extends from a radially outer end part of the first radially extended part 73C to the upper side. The axially extended part 74C extends to the upper side farther than the tubular parts 64A, 64B, and 64C. The axially extended part 74C has a plate or substantially plate shape of which a plate surface is orthogonal to the radial direction.

The coil connecting part 75C is connected to an upper end part of the axially extended part 74C. Accordingly, the coil connecting part 75C is connected to a proximal end part of the first radially extended part 73C in the radial direction via the axially extended part 74C. A shape of the coil connecting part 75C is the same as the shape of the coil connecting part 75A. The coil connecting part 75C is exposed to the outside of the bus-bar holder 60. The coil connecting part 75C is disposed on the other side in the circumferential direction of the coil connecting part 75B.

The coil connecting part 75C is disposed on the upper side of the stator core pieces 31a that do not support the supported part 67. As described above, by providing the coil connecting part 75C on the proximal end part of the first radially extended part 73C that extends in the radial direction from the proximal end part of the arm part 62a in the circumferential direction, the coil connecting part 75C may be disposed on the upper side of the stator core pieces 31a that do not support the bus-bar holder 60. Accordingly, the coil lead wire 35a of the coil 35 mounted on the stator core pieces 31a that do not support the bus-bar holder 60 and the bus-bar 70 may be easily connected to each other.

The second radially extended part 76C extends from the end part of the first circumferentially extended part 71C on one side in the circumferential direction to the radially outer side. The second radially extended part 76C extends from the inner curved part 62 to the outer curved part 63 via the base part 61. The second radially extended part 76C has a plate or substantially plate shape of which a plate surface is parallel to the circumferential direction. A center part of the second radially extended part 76C in the radial direction is a center protrusion 76Ca that is a part of the second radially extended part 76C, which is bent and protrudes to the upper side. The center protrusion 76Ca extends in the radial direction. A direction in which the center protrusion 76Ca extends is parallel to a direction in which the second radially extended part 77A extends and a direction in which the second radially extended part 77B extends. The center protrusion 76Ca is disposed at the position identical with the position of the second radially extended parts 77A and 77B in the axial direction. The center protrusion 76Ca penetrates the inside of the insertion hole part 66C in the radial direction.

The center protrusion 76Ca has a connection terminal part 70Ca. That is, the third phase bus-bar 70C has the connection terminal part 70Ca. The connection terminal part 70Ca is a middle part of the center protrusion 76Ca in the radial direction. The connection terminal part 70Ca is disposed inside the insertion hole part 66C. Accordingly, the connection terminal part 70Ca is exposed to the outside of the bus-bar holder 60 via the insertion hole part 66C. More specifically, as illustrated in FIG. 7, the connection terminal part 70Ca is exposed to the upper side of the bus-bar holder 60. As illustrated in FIG. 6, a width of the connection terminal part 70Ca is smaller than that of other parts of the center protrusion 76Ca. The connection terminal part 70Aa, the connection terminal part 70Ba, and the connection terminal part 70Ca are disposed at the same position in the axial direction.

A radially inner end part of the second radially extended part 76C is disposed on the radially inner side farther than the connection terminal parts 70Aa, 70Ba, and 70Ca. A radially outer end part of the second radially extended part 76C is disposed on the radially outer side farther than the connection terminal parts 70Aa, 70Ba, and 70Ca. Accordingly, the third phase bus-bar 70C is disposed to straddle from the radially inner sides farther than the connection terminal parts 70Aa, 70Ba, and 70Ca, to the radially outer sides farther than the connection terminal parts 70Aa, 70Ba, and 70Ca. That is, at least one of two or more of the bus-bars 70 held on the bus-bar holder 60 is disposed to straddle from the radially inner sides farther than the connection terminal parts 70Aa, 70Ba, and 70Ca, to the radially outer sides farther than the connection terminal parts 70Aa, 70Ba, and 70Ca. The second circumferentially extended part 77C extends from the radially outer end part of the second radially extended part 76C to both sides of the circumferential direction. The entire second circumferentially extended part 77C is buried in the outer curved part 63.

The inspection unit 72C is connected to an end part of the second circumferentially extended part 77C on one side in the circumferential direction. The inspection unit 72C has a disk or substantially disk shape of which a plate surface is orthogonal to the axial direction. That is, the inspection unit 72C has a circular or substantially circular shape when seen from the upper side. An outer diameter of the inspection unit 72C is larger than a dimension of the second circumferentially extended part 77C in the radial direction. The inspection unit 72C is provided on a bottom part of the tubular part 64C. The inspection unit 72C is exposed to the inside of the tubular part 64C. The inspection unit 72C constitutes at least a part of a bottom surface of the hole part 65C. In the example embodiment of the present disclosure, the entire bottom surface of the hole part 65C is constituted as an upper surface of the inspection unit 72C. Accordingly, the inspection unit 72C is exposed to the upper side of the bus-bar holder 60 via the hole part 65C.

At least some parts of a part of the third phase bus-bar 70C from the inspection unit 72C to the connection terminal part 70Ca and at least some parts of a part of the third phase bus-bar 70C from the inspection unit 72C to the coil connecting part 75C are buried in the bus-bar holder 60, and the upper sides thereof are covered with the bus-bar holder 60. In the example embodiment of the present disclosure, the entire part of the third phase bus-bar 70C from the inspection unit 72C to the connection terminal part 70Ca is buried in the bus-bar holder 60 and the upper side thereof is covered with the bus-bar holder 60. In the third phase bus-bar 70C from the inspection unit 72C to the coil connecting part 75C, the entire part excluding parts of the connection terminal part 70Ca and the first radially extended part 73C on the radially outer side is buried in the bus-bar holder 60, and the upper side thereof is covered with the bus-bar holder 60.

As illustrated in FIG. 4, the coil lead wires 35a pass through the inside of the coil connecting parts 75A, 75B, and 75C, respectively. Although illustration is omitted, a U-shaped proximal end part on an opening side of each of the coil connecting parts 75A, 75B, and 75C is caulked from both sides of the radial direction, and the coil lead wire 35a is interposed therein from both sides of the radial direction. The coil connecting parts 75A, 75B, and 75C and the coil lead wires 35a are fixed to each other by for example, welding. Accordingly, the coil connecting parts 75A, 75B, and 75C are connected to the coil lead wires 35a, and the bus-bars 70 are electrically connected to the stator 30.

The coil connecting part 75A, the coil connecting part 75B, and the coil connecting part 75C are disposed at the same position in the axial direction. For this reason, an axial position when caulking each of the coil connecting parts 75A, 75B, and 75C and an axial position when welding each of the coil connecting parts 75A, 75B, and 75C to the coil lead wire 35a may become identical in each of the coil connecting parts 75A, 75B, and 75C. Therefore, a work of connecting the coil lead wire 35a to the coil connecting parts 75A, 75B, and 75C, respectively may be simplified.

According to the example embodiment of the present disclosure, the coil connecting parts 75A, 75B, and 75C are disposed on the upper side of the tubular parts 64A, 64B, and 64C. That is, the upper end parts of the tubular parts 64A, 64B, and 64C are disposed on the lower side of the coil connecting parts 75A, 75B, and 75C. Accordingly, when connecting the coil connecting parts 75A, 75B, and 75C to the coil lead wires 35a, it is possible to restrain a tool that caulks the coil connecting parts 75A, 75B, and 75C and a tool that welds the coil connecting parts 75A, 75B, and 75C to the coil lead wires 35a from interfering the tubular parts 64A, 64B, and 64C. Therefore, it is easy to connect the coil connecting parts 75A, 75B, and 75C and the coil lead wires 35a to each other.

Each of the connection terminal parts 70Aa, 70Ba, and 70Ca is electrically connected to the control device 80. More specifically, as illustrated in FIG. 1, the terminals 82a of each of the power supply terminal parts 82 are respectively inserted into the insertion hole parts 66A, 66B, and 66C, and come into contact with the connection terminal parts 70Aa, 70Ba, and 70Ca, respectively, that are exposed to the inside of the insertion hole parts 66A, 66B, and 66C. Accordingly, each of the connection terminal parts 70Aa, 70Ba, and 70Ca comes into contact with and is electrically connected to the control device 80 via the terminal 82a.

As described above, in a case where the bus-bar holder 60 has the insertion hole parts 66A, 66B, and 66C into which the terminals 82a are inserted, it is easy to apply a load in the axial direction to the bus-bar holder 60 when connecting each of the terminals 82*a* to the insertion hole parts 66A, 66B, and 66C. On the contrary, since the stator core 31 may receive the load applied to the bus-bar holders 60 as described above in the example embodiment of the present disclosure, it is possible to restrain the insulators 34 from being damaged. Therefore, in a case where the bus-bar holder 60 has the insertion hole parts 66A, 66B, and 66C into which the terminals 82*a* are inserted, the effect to restrain the damage to the insulators 34 in the example embodiment of the present disclosure is particularly useful.

In particular, in the example embodiment of the present disclosure, each of the terminals 82*a* is press-fitted into, for example, each of the insertion hole parts 66A, 66B, and 66C. In this case, when connecting each of the terminals 82*a* to the insertion hole parts 66A, 66B, and 66C, it is easy to apply a relatively large load in the axial direction to the bus-bar holder 60. Even in this case, since the stator core 31 may receive the load applied to the bus-bar holder 60, it is possible to restrain the insulators 34 from being damaged.

In the example embodiment of the present disclosure, the insertion hole parts 66A, 66B, and 66C are disposed between the first supported parts 67*a* and 67*b* and the second supported parts 67*c* and 67*d* in the radial direction. For this reason, even in a case where the relatively large load in the axial direction is applied to the bus-bar holder 60 via the insertion hole parts 66A, 66B, and 66C, it is easy for the load to be uniformly received by both of the first supported parts 67*a* and 67*b* and the second supported parts 67*c* and 67*d*. Therefore, it is easy for the stator core 31 to stably support the bus-bar holders 60.

For example, the U-phase terminal 82*a* is connected to the connection terminal part 70A*a* of the first phase bus-bar 70A. The V-phase terminal 82*a* is connected to the connection terminal part 70B*a* of the second phase bus-bar 70B. The W-phase terminal 82*a* is connected to the connection terminal part 70C*a* of the third phase bus-bar 70C. Accordingly, currents having phases different from each other are supplied to the first phase bus-bar 70A, the second phase bus-bar 70B, and the third phase bus-bar 70C via each of the terminals 82*a*. Therefore, three-phase alternating current power is supplied from the control device 80 to a coil group of one power system via the first phase bus-bar 70A, the second phase bus-bar 70B, and the third phase bus-bar 70C.

In a case where a plurality of power systems are provided as in the example embodiment of the present disclosure, for example, the number of the power supply terminal parts 82 to be connected increase, and when relative positions between the power supply terminal parts 82 are shifted, connection between each of the power supply terminal parts 82 and each of the connection terminal parts 70A*a*, 70B*a*, and 70C*a* becomes difficult in some cases.

On the contrary, the plurality of bus-bar holders 60, which are distinct members separated from each other, are provided in the example embodiment of the present disclosure. For this reason, it is easy to independently and respectively adjust the position of each of the bus-bar holders 60 according to a position of each of the power supply terminal parts 82 connected to the bus-bars 70 held on each of the bus-bar holders 60. Therefore, even in a case where the relative positions between the power supply terminal parts 82 are shifted, each of the power supply terminal parts 82 and each of the connection terminal parts 70A*a*, 70B*a*, and 70C*a* may be easily connected to each other by adjusting relative positions between the bus-bar holders 60. Therefore, in the example embodiment of the present disclosure, the motor 10 that has a structure of having a plurality of coil groups which have power systems different from each other and facilitating easy connection between the connection terminal parts 70A*a*, 70B*a*, and 70C*a* of the bus-bars 70 of each power system and an electrical component is obtained.

In the example embodiment of the present disclosure, the electrical component connected to the connection terminal parts 70A*a*, 70B*a*, and 70C*a* is the control device 80 as a power supply device, and the bus-bar holder 60 holds the phase bus-bars among the bus-bars 70. For this reason, connection of the connection terminal parts 70A*a*, 70B*a*, and 70C*a*, and the control device 80 that supplies power to the stator 30 may be easily facilitated. In the example embodiment of the present disclosure, the bus-bar holder 60 holds the first phase bus-bar 70A, the second phase bus-bar 70B, and the third phase bus-bar 70C of one power system. For this reason, the phase bus-bars of one power system are put together and thereby it is possible to hold the one combined phase bus-bars on the one bus-bar holder 60. Therefore, in a case where the plurality of terminals 82*a* of one power system are put together as the power supply terminal part 82 as in the example embodiment of the present disclosure, it is easy to connect the combined the power supply terminal parts 82 and the three connection terminal parts 70A*a*, 70B*a*, and 70C*a*.

According to the example embodiment of the present disclosure, each of the bus-bar holders 60 may be disposed appropriately in a part where it is necessary to dispose the bus-bars 70. For this reason, it is easy to make a volume of each of the bus-bar holders 60 to be small as a whole compared to a case where all the bus-bars are held on one bus-bar holder. Therefore, manufacturing costs of the bus-bar holder 60 may be reduced.

According to the example embodiment of the present disclosure, the bus-bar holders 60 are disposed so as to be movable in the circumferential direction. For this reason, after disposing each of the bus-bar holders 60 on the stator 30, the bus-bar holders 60 may be moved in the circumferential direction. Accordingly, it is easy to adjust the circumferential position of the bus-bar holder 60 in accordance with a position of the power supply terminal part 82, and connection of the connection terminal parts 70A*a*, 70B*a*, and 70C*a*, and the control device 80 may be facilitated further. In the example embodiment of the present disclosure, since a gap is provided in at least one of the parts between the wall parts 34*c*, 34*d*, 34*f*, and 34*g*, and the supported part 67 in the circumferential direction, the circumferential position of the bus-bar holder 60 may be adjusted according to the size of the gap.

According to the example embodiment of the present disclosure, the teeth 33 that support the supported part 67 are only some teeth of the teeth 33. For this reason, since a region where the bus-bar holder 60 is not disposed may be provided on the upper side of the teeth 33 that do not support the supported part 67, it is easy to make the volume of the bus-bar holder 60 to be smaller. Accordingly, the manufacturing costs of the bus-bar holder 60 may to be further reduced.

According to the example embodiment of the present disclosure, the bus-bar holders 60 are disposed at an interval from each other in the circumferential direction. For this reason, the bus-bar holders 60 may be disposed so as to be movable in the circumferential direction. In addition, the region where the bus-bar holder 60 is not disposed may be provided between the bus-bar holders 60 in the circumferential direction. For this reason, since it is possible to make the volume of the bus-bar holder 60 to be smaller, and the manufacturing costs of the bus-bar holder 60 may be further reduced.

According to the example embodiment of the present disclosure, the plurality of bus-bar holders 60 are disposed at an equal interval over the circumference along the circumferential direction. For this reason, for example, in a case where the power supply terminal parts 82 are disposed at an equal interval over the circumference along the circumferential direction, it is easy to connect each of the power supply terminal parts 82 to the bus-bars 70 held on each of the bus-bar holders 60.

According to the example embodiment of the present disclosure, the connection terminal parts 70Aa, 70Ba, and 70Ca are disposed inside each of the insertion hole parts 66A, 66B, and 66C. For this reason, in a case where the power supply terminal part 82 extending from the control device 80 to the bus-bar unit 90 is provided as in the example embodiment of the present disclosure, the power supply terminal part 82 may be connected to the connection terminal parts 70Aa, 70Ba, and 70Ca by inserting the terminals 82a of the power supply terminal part 82 into the insertion hole parts 66A, 66B, and 66C. In addition, for example, compared to a case where the connection terminal part extends to the upper side and is connected to the control device, it is easy to have a point of application of a force that is generated between the control device 80 and the bus-bar holder 60 to be on a bus-bar holder 60 side. For this reason, it is easy to move the bus-bar holders 60 in the circumferential direction, and thereby it is easy to adjust the circumferential positions of the bus-bar holders 60.

As illustrated in FIG. 6, each of the inspection units 72A, 72B, and 72C is electrically connectable to an inspection terminal IA that supplies power to the stator 30. The inspection terminal IA has a cylindrical or substantially cylindrical shape that extends in the axial direction. A lower end part of the inspection terminal IA is inserted into each of the tubular parts 64A, 64B, and 64C. A lower surface of the inspection terminal IA comes into contact with each of the upper surfaces of the inspection units 72A, 72B, and 72C. Accordingly, for example, it may be possible to make a U-phase current to flow from the inspection unit 72A to the first phase bus-bar 70A via the inspection terminal IA. For example, it may be possible to make a V-phase current to flow from the inspection unit 72B to the second phase bus-bar 70B via the inspection terminal IA. For example, it may be possible to make a W-phase current to flow from the inspection unit 72C to the third phase bus-bar 70C.

Therefore, in the example embodiment of the present disclosure, three-phase alternating current power may be supplied to the stator 30 by connecting the inspection terminals IA to the inspection units 72A, 72B, and 72C. For this reason, driving inspection of the motor 10 may be performed without connecting the inspection terminals IA to the connection terminal parts 70Aa, 70Ba, and 70Ca. Accordingly, deformation of the bus-bar holder 60 that holds the connection terminal parts 70Aa, 70Ba, and 70Ca, and the connection terminal parts 70Aa, 70Ba, and 70Ca before connecting the terminals 82a to the connection terminal parts 70Aa, 70Ba, and 70Ca may be restrained. Therefore, the motor 10 that has a structure which makes it possible to perform driving inspection while restraining a difficulty in connecting the control device 80 to the connection terminal parts 70Aa, 70Ba, and 70Ca is obtained.

In a case where the terminals 82a of the power supply terminal part 82 are inserted into the insertion hole parts 66A, 66B, and 66C and are connected to the connection terminal parts 70Aa, 70Ba, and 70Ca as in the example embodiment of the present disclosure, the insertion hole parts 66A, 66B, and 66C deform in some cases as the inspection terminals IA are inserted when connecting the inspection terminals IA to the connection terminal parts 70Aa, 70Ba, and 70Ca. For this reason, after performing driving inspection of the motor 10, in particular, it becomes difficult to connect the power supply terminal parts 82 and the connection terminal parts 70Aa, 70Ba, and 70Ca to each other in some cases. Therefore, the effect to restrain the difficulty in connecting the control device 80 and the connection terminal parts 70Aa, 70Ba, and 70Ca to each other is particularly useful in a case of a configuration where the terminals 82a of the power supply terminal part 82 are inserted into the insertion hole parts 66A, 66B, and 66C.

According to the example embodiment of the present disclosure, at least some parts of a part of each of the bus-bars 70 from the inspection units 72A, 72B, and 72C to the connection terminal parts 70Aa, 70Ba, and 70Ca and at least some parts of a part of each of the bus-bars 70 from the inspection units 72A, 72B, and 72C to the coil connecting parts 75A, 75B, and 75C are buried in the bus-bar holder 60, and the upper sides thereof are covered with the bus-bar holder 60. For this reason, when seen from the upper side of the bus-bar holder 60, the inspection units 72A, 72B, and 72C are provided by partitioning some parts of the connection terminal parts 70Aa, 70Ba, and 70Ca and the coil connecting parts 75A, 75B, and 75C, and the bus-bar holder 60. Accordingly, it is easy to adopt a structure in which it is easy to connect the inspection terminals IA to the inspection units 72A, 72B, and 72C.

Specifically, a configuration in which each of the hole parts 65A, 65B, and 65C, of which at least a part of the bottom surface is constituted by each of the inspection units 72A, 72B, and 72C, is provided may be adopted. Accordingly, the inspection units 72A, 72B, and 72C and the inspection terminals IA may be connected to each other by inserting the inspection terminals IA into the hole parts 65A, 65B, and 65C. Therefore, the inspection terminals IA may be positioned in the direction orthogonal to the axial direction by inner circumferential surfaces of the hole parts 65A, 65B, and 65C, and connection between the inspection units 72A, 72B, and 72C and the inspection terminals IA may be facilitated. Also, in the example embodiment of the present disclosure, the hole parts 65A, 65B, and 65C are constituted by providing the tubular parts 64A, 64B, and 64C. Accordingly, it may be possible for the inspection terminals IA to make the axial dimensions of the part to be inserted into the hole parts 65A, 65B, and 65C to be large by protruding partially a part of the bus-bar holder 60 to the upper side. On the other hand, it is not necessary to make the axial dimensions of parts other than the tubular parts 64A, 64B, and 64C of the bus-bar holder 60 to be large, and thereby it may be possible to make the axial dimensions to be relatively small. Therefore, an increase in the volume of the entire bus-bar holder 60 may be restrained. Accordingly, it may be possible to stabilize connection between the inspection terminals IA and the inspection units 72A, 72B, and 72C while restraining the bus-bar holder 60 from getting larger.

In the example embodiment of the present disclosure, exposed areas of the inspection units 72A, 72B, and 72C are larger than exposed areas of the connection terminal parts 70Aa, 70Ba, and 70Ca. For this reason, it is easier to connect the inspection terminals IA to the inspection units 72A, 72B, and 72C. In addition, in the example embodiment of the present disclosure, the inspection units 72A, 72B, and 72C have a circular or substantially circular shape when seen from the upper side. For this reason, the same exposed area may be secured while making the maximum dimensions of the inspection units 72A, 72B, and 72C in the direction orthogonal to the axial direction to be smaller, for example, compared to a case where a shape seen from the upper side is polygonal. Therefore, it is easy to make the bus-bar holder 60 to be miniaturized in the direction orthogonal to the axial direction while making the exposed areas of the inspection units 72A, 72B, and 72C to be larger.

The inspection unit 72A, the inspection unit 72B, and the inspection unit 72C are disposed at the same position in the axial direction. That is, axial positions of the inspection units 72A, 72B, and 72C of two or more bus-bars 70 held by the bus-bar holder 60 are equal to each other. For this reason, it is easy to connect the plurality of inspection terminals IA to a plurality of the inspection units 72A, 72B, and 72C respectively.

The inspection unit 72A and the inspection unit 72B are positioned on the radially inner side farther than the connection terminal parts 70Aa, 70Ba, and 70Ca. The inspection unit 72C is positioned on the radially outer side farther than the connection terminal parts 70Aa, 70Ba, and 70Ca. That is, in the example embodiment of the present disclosure, the inspection units include the inspection units 72A and 72B positioned on the radially inner side farther than the connection terminal parts 70Aa, 70Ba, and 70Ca, and the inspection unit 72C positioned on the radially outer side farther than the connection terminal parts 70Aa, 70Ba, and 70Ca. Therefore, it is easy to miniaturize a circumferential dimension of the bus-bar holder 60 compared to a case where all of the plurality of inspection units 72A, 72B, and 72C are arranged inspection unit in the circumferential direction. In the example embodiment of the present disclosure, the third phase bus-bar 70C is disposed to straddle from the radially inner sides farther than the connection terminal parts 70Aa, 70Ba, and 70Ca to the radially outer sides farther than the connection terminal parts 70Aa, 70Ba, and 70Ca. For this reason, it is easy to dispose the inspection unit 72C of the third phase bus-bar 70C on the opposite side of the inspection units 72A and 72B with the connection terminal parts 70Aa, 70Ba, and 70Ca being interposed therebetween in the radial direction.

As illustrated in FIG. 1, the bearing holder 40 is disposed on the upper side of the bus-bar units 90. The bearing holder 40 has an annular or substantially annular shape centered on the central axis J. In the example embodiment of the present disclosure, the bearing holder 40 is a lid part covering the upper side of the bus-bar holders 60. An outer circumferential surface of the bearing holder 40 is fixed to the inner circumferential surface of the housing 11. The bearing 52 is held on an inner circumferential surface of the bearing holder 40. As illustrated in FIGS. 1 and 7, the bearing holder 40 has a first through-hole 40a and a second through-hole 40b which penetrate the bearing holder 40 in the axial direction.

In the example embodiment of the present disclosure, one first through-hole 40a is provided for each power system. That is, in the example embodiment of the present disclosure, four first through-holes 40a in total are provided. As illustrated in FIG. 7, the first through-hole 40a overlaps with the connection terminal parts 70Aa, 70Ba, and 70Ca when seen along the axial direction. The first through-hole 40a has a shape in accordance with an external shape of the base part 61 when seen along the axial direction. An inner edge of the first through-hole 40a is disposed inside the external shape of the base part 61. As illustrated in FIG. 1, the terminals 82a of the power supply terminal part 82 pass through the first through-hole 40a. In the example embodiment of the present disclosure, three terminals 82a pass through one first through-hole 40a.

In the example embodiment of the present disclosure, three second through-holes 40b are provided for each power system. That is, in the example embodiment of the present disclosure, 12 second through-holes 40b in total are provided. As illustrated in FIG. 7, the second through-holes 40b provided for one power system overlap the inspection units 72A, 72B, and 72C respectively when seen along the axial direction. For this reason, the inspection terminals IA and the inspection units 72A, 72B, and 72C may be connected by passing the inspection terminals IA through the second through-holes 40b from the upper side of the bearing holder 40. Accordingly, even after the bearing holder 40 is disposed, driving inspection of the motor 10 may be performed by the inspection terminals IA. The second through-holes 40b have a circular or substantially circular shape. An inner edge of each of the second through-holes 40b is disposed inside each of the hole parts 65A, 65B, and 65C when seen along the axial direction.

Figure 8:
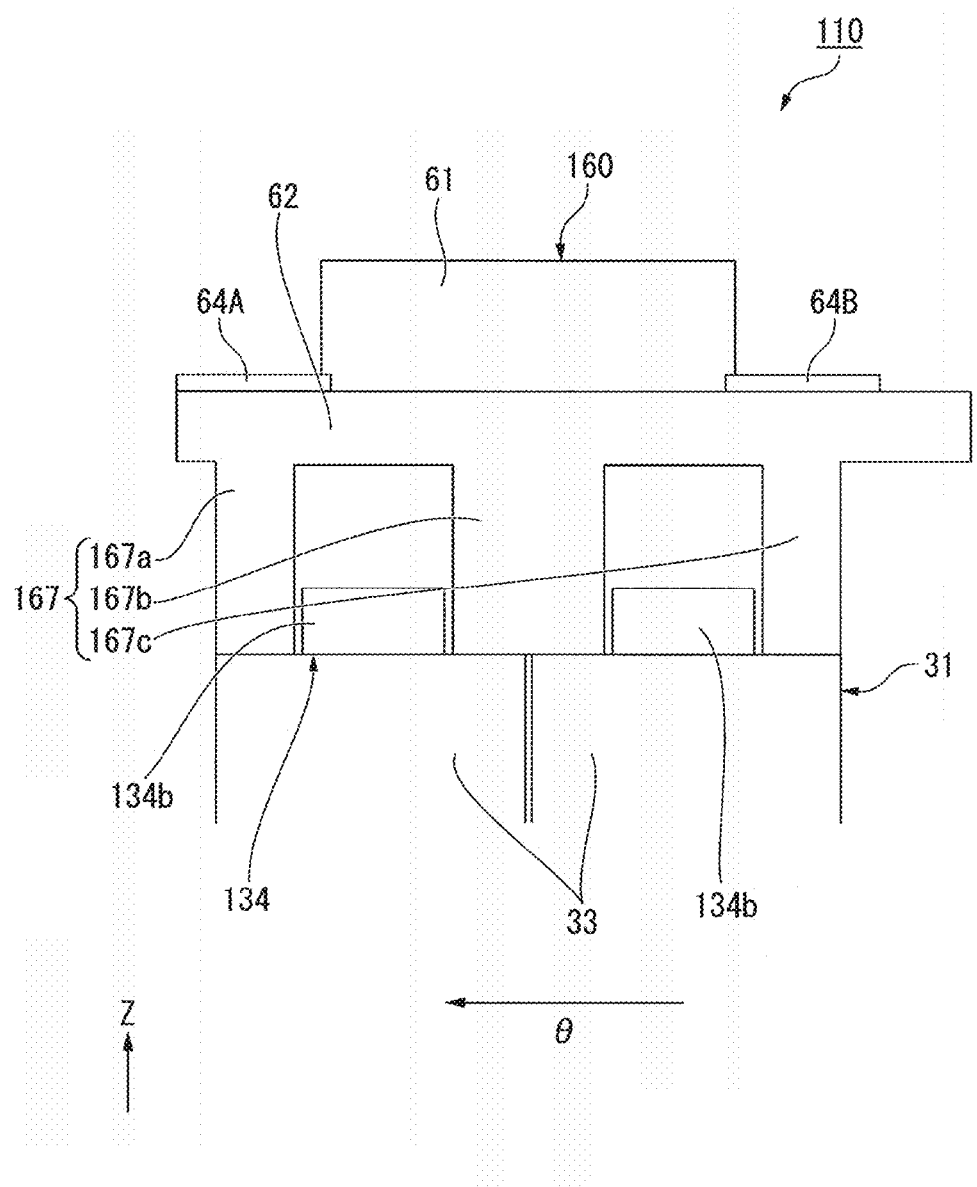
FIG. 8 is a view illustrating a portion of a stator and a portion of a bus-bar unit according to a modification example of an example embodiment of the present disclosure, which is seen from a radially inner side.

As illustrated in FIG. 8, a plurality of supported parts 167 are provided on a bus-bar holder 160 of a motor 110 along the circumferential direction according to the modification example. The plurality of supported parts 167 include a first supported part 167a, a first supported part 167b, and a first supported part 167c. The first supported part 167a is supported from the lower side by an end part of one side in the circumferential direction of the tooth 33. The first supported part 167c is supported from the lower side by an end part of the teeth 33 on the other side in the circumferential direction, which are adjacent on the other side in the circumferential direction of the teeth 33 that supports the first supported part 167a.

The first supported part 167b is disposed between the first supported part 167a and the first supported part 167c in the circumferential direction. The first supported part 167b is supported from the lower side by both of the teeth 33 which are adjacent to each other in the circumferential direction and support the first supported part 167a and the first supported part 167c. Inner protrusions 134b of insulators 134 are disposed between the first supported part 167a and the first supported part 167b in the circumferential direction and between the first supported part 167b and the first supported part 167c in the circumferential direction. In the modification example, the inner protrusion 134b is a wall part disposed between the supported parts 167 adjacent to each other in the circumferential direction. The bus-bar holder 160 may be positioned in the circumferential direction by the inner protrusions 134b which are wall parts. In FIG. 8, a gap is provided respectively between each of the inner protrusions 134b and the first supported part 167a, 167b, or 167c in the circumferential direction.

In the modification example, a configuration where two second supported parts as the second supported parts 67c and 67d are provided may be adopted, or a configuration where three second supported parts as the first supported parts 167a, 167b, and 167c are provided may be adopted. In a case where two second supported parts as the second supported parts 67c and 67d are provided, the number of the first supported parts and the number of the second supported parts are different. In this case, for example, by increasing the number of supported parts to be provided on a side where it is easy to apply a load out of the radially inner side and the radially outer side, the bus-bar holders may be stably supported, and the number of supported parts in total may decrease.

The present disclosure is not limited to the example embodiment of the present disclosure described above, and it is also possible to adopt other configurations below.

Although a configuration where each of the bus-bars held on the bus-bar holder has a connection terminal part is adopted in the example embodiment of the present disclosure described above, the present disclosure is not limited thereto. As for each of the plurality of bus-bar holders, it is preferred that at least one of the bus-bars held on the bus-bar holder has the connection terminal part. That is, the bus-bar holder may hold a bus-bar that does not have the connection terminal part insofar as the bus-bar holder holds one or more bus-bars having the connection terminal part.

The number of the bus-bars held by the bus-bar holder is not particularly limited insofar as the number is one or more. The bus-bar holder may hold only one bus-bar. The numbers of the bus-bars held by the plurality of bus-bar holders may be different from each other. Although a configuration where each of the bus-bar holders holds each of the phase bus-bars is adopted in the example embodiment of the present disclosure described above, the present disclosure is not limited thereto. A configuration where at least one of the bus-bar holders holds the phase bus-bar may be adopted. That is, a bus-bar holder that holds a bus-bar other than the phase bus-bar may be provided.

The bus-bar other than the phase bus-bar is, for example, a neutral point bus-bar. The neutral point bus-bar is a bus-bar that connects two or more coils while two or more coils being as a neutral point. That is, at least one bus-bar holder may hold the neutral point bus-bar out of the bus-bars. In this case, when connecting a connection terminal part of the neutral point bus-bar and an electrical component to each other, the circumferential position of the bus-bar holder may be adjusted, and it is easy to connect the neutral point bus-bar and the electrical component to each other.

Although a configuration where each of the bus-bar holders holds three phase bus-bars which are the first phase bus-bar, the second phase bus-bar, and the third phase bus-bar of one power system is adopted in the example embodiment of the present disclosure described above, the present disclosure is not limited thereto. A configuration where at least one bus-bar holder holds the first phase bus-bar, the second phase bus-bar, and the third phase bus-bar of one power system may be adopted.

For example, a configuration where at least one bus-bar holder holds only one type of the phase bus-bar out of the first phase bus-bar, the second phase bus-bar, and the third phase bus-bar may be adopted. In this case, the phase bus-bars to which the same phase current is supplied are put together and may be held by one bus-bar holder. In this case, at least one bus-bar holder holds two or more bus-bars in which power systems of coils to be connected are different from each other.

For example, a configuration where at least two of the first phase bus-bar, the second phase bus-bar, and the third phase bus-bar in at least one power system are held on the bus-bar holders different from each other may be adopted.

As described above, the number and types and the like of the bus-bars held on the bus-bar holder are not particularly limited, and may be determined appropriately according to the type and disposition of an electrical component to be connected to the connection terminal part of the bus-bar.

The number of bus-bar holders is not particularly limited insofar as long as the number is two or more. The shapes of the plurality of bus-bar holders may be different from each other. The bus-bar holders in the assembled motor may be fixed with respect to the circumferential direction. Even in this case, as the plurality of bus-bar holders which are distinct members separated from each other are provided, the circumferential position of each bus-bar holder may be adjusted independently from each other and then may be disposed when assembling the motor. The plurality of bus-bar holders may be in contact with each other.

The plurality of bus-bar holders may be disposed at unequal intervals over the circumference along the circumferential direction. In this case, for example, in a case where the power supply terminal parts are disposed at unequal intervals over the circumference along the circumferential direction, it is easy to respectively connect each of the power supply terminal parts to the bus-bars held on each of the bus-bar holders.

A gap may not be provided between the wall part and the supported part in the circumferential direction. That is, the wall part and the supported part may be in contact with each other in the circumferential direction. The wall part may be provided on only one of both sides of the supported part in the circumferential direction. Although the wall part is a part of the insulator in the example embodiment of the present disclosure, the present disclosure is not limited thereto. The wall part is not particularly limited insofar as the wall part is a part of the stator, and may be a distinct member from the insulator. The wall part may not be provided. The number of the supported parts is not particularly limited. The supported parts may be supported by the insulator.

Although the insertion hole part is described as a hole that penetrates the bus-bar holder in the example embodiment of the present disclosure described above, the present disclosure is not limited thereto. The insertion hole part may be a hole having a bottom part. In addition, the insertion hole part may not be provided. In this case, the connection terminal part of the bus-bar may extend to the upper side and may be connected to an electrical component such as the control device, etc.

A part of the bus-bar from the inspection unit to the connection terminal part and a part of the bus-bar from the inspection unit to the coil connecting part may not be buried in the bus-bar holder, and the upper sides thereof may not be covered with the bus-bar holder. The exposed area of the inspection unit may be the same as the exposed area of the connection terminal part, or may be smaller than the exposed area of the connection terminal part. The tubular part may not be provided. The hole part may not be provided. The shape of the inspection unit is not particularly limited, and may be, for example, a polygonal shape. The number of inspection units is not particularly limited. The plurality of the inspection units may be disposed at different positions in the axial direction. The inspection units may not be provided.

The number of power systems is not particularly limited insofar as the number is two or more. That is, it is sufficient that the motor is a motor having a plurality of systems. The electrical component is not particularly limited insofar as the electrical component is a component electrically connected to the connection terminal part of the bus-bar, and may be other than the power supply device. For example, in a case where the bus-bar is the neutral point bus-bar, the electrical component may be a detection device that detects a current flowing in the neutral point bus-bar.

Features of the above-described preferred embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
    a rotor including a shaft disposed along a central axis;
    a stator including a plurality of coils and facing the rotor via a gap in a radial direction;
    a plurality of bus-bars that are electrically connected to the stator; and
    a plurality of bus-bar holders that are disposed on an one side in the axial direction of the stator and are distinct members separated from each other; wherein
    the plurality of coils define a plurality of coil groups having power systems different from each other;
    each of the bus-bar holders holds at least one of the bus-bars different from each other;
    in each of the bus-bar holders, at least one of the bus-bars held on the bus-bar holder includes a connection terminal electrically connected to an electrical component;
    each of the bus-bar holders has a supported part that is in contact with the stator and is supported by the stator from the other side in the axial direction, and the stator has one pair of wall parts that is disposed on both sides of the supported part in a circumferential direction; and
    a gap is provided between at least one of parts between the wall parts and the supported part in the circumferential direction.

2. The motor according to claim 1, wherein the bus-bar holders are movable in a circumferential direction.

3. The motor according to claim 1, wherein
    each of the bus-bar holders includes a supported portion that is in contact with the stator and is supported by the stator from the other side in the axial direction;
    a plurality of the supported portions are provided along a circumferential direction;
    the stator includes a wall portion between the supported portions adjacent to each other in the circumferential direction; and
    a gap is provided between at least one of portions between the wall portion and the supported portions in the circumferential direction.

4. The motor according to claim 1, wherein the plurality of bus-bar holders are disposed at an interval from each other in a circumferential direction.

5. The motor according to claim 1, wherein the plurality of bus-bar holders are disposed at an equal interval from each other over a circumference along a circumferential direction.

6. The motor according to claim 1, wherein the plurality of bus-bar holders are disposed at an unequal interval from each other over a circumference along a circumferential direction.

7. The motor according to claim 1, wherein each of the bus-bar holders includes an insertion hole portion recessed from one side in the axial direction to the other side in the axial direction, and the connection terminal portion is disposed inside the insertion hole portion.

8. The motor according to claim 1, wherein each of the bus-bar holders holds two or more of the bus-bars.

9. The motor according to claim 1, wherein at least one of the bus-bar holders holds a phase bus-bar electrically connected to a power supply device that supplies power to the stator, out of the bus-bars.

10. The motor according to claim 9, wherein the phase bus-bar includes a first phase bus-bar, a second phase bus-bar, and a third phase bus-bar, to which currents having phases different from each other are supplied, for each power system, and at least one of the bus-bar holders holds the first phase bus-bar, the second phase bus-bar, and the third phase bus-bar of one power system.

11. The motor according to claim 9, wherein the phase bus-bar includes a first phase bus-bar, a second phase bus-bar, and a third phase bus-bar, to which currents having phases different from each other are supplied, for each power system, and at least one of the bus-bar holders holds only any one type of the phase bus-bar out of the first phase bus-bar, the second phase bus-bar, and the third phase bus-bar.

12. The motor according to claim 9, wherein the phase bus-bar includes a first phase bus-bar, a second phase bus-bar, and a third phase bus-bar, to which currents having phases different from each other are supplied, for each power system, and at least two of the first phase bus-bar, the second phase bus-bar, and the third phase bus-bar of at least one of the power systems are held on the bus-bar holders different from each other.

13. The motor according to claim 1, wherein at least one of the bus-bar holders holds a neutral point bus-bar that connects two or more coils while two or more coils being as a neutral point to each other, out of the bus-bars.

14. The motor according to claim 1, wherein at least one of the bus-bar holders holds two or more of the bus-bars having the power systems of the coils to be connected, which are different from each other.

15. A motor comprising:
    a rotor including a shaft disposed along a central axis;
    a stator including a plurality of coils and facing the rotor via a gap in a radial direction;
    a plurality of bus-bars that are electrically connected to the stator; and
    a plurality of bus-bar holders that are disposed on an one side in the axial direction of the stator and are distinct members separated from each other; wherein
    the plurality of coils define a plurality of coil groups having power systems different from each other;
    each of the bus-bar holders holds at least one of the bus-bars different from each other;
    in each of the bus-bar holders, at least one of the bus-bars held on the bus-bar holder includes a connection terminal electrically connected to an electrical component; and
    the stator includes a plurality of teeth extending in the radial direction, the plurality of teeth are disposed along a circumferential direction, the plurality of bus-bar holders are disposed along the circumferential direction, each of the bus-bar holders includes a supported portion that is in contact with the stator and is supported by the stator from the other side in the axial direction, the supported portion is supported by the teeth, and the teeth which support the supported portion are only some of the teeth out of the plurality of teeth.

16. The motor according to claim 15, wherein
    each of the bus-bar holders includes an arm portion that extends in the circumferential direction from the one side in the axial direction of the teeth that support the supported portion, to the one side in the axial direction of the teeth adjacent in the circumferential direction with respect to the teeth that support the supported portion;
    the arm portion is disposed on the one side in the axial direction in end portions of one side in the radial direction of the teeth; and
    at least one of the bus-bars includes a radially extended portion that extends from a proximal end portion of the arm portion in the circumferential direction to the other side in the radial direction, and a coil connecting portion that is connected to a proximal end portion of the radially extended portion in the radial direction and is connected to a conducting wire extending from at least one of the coils.

* * * * *